(12) United States Patent
Yamamoto et al.

(10) Patent No.: US 7,358,629 B2
(45) Date of Patent: Apr. 15, 2008

(54) ELECTROMAGNETIC ACTUATOR

(75) Inventors: Masami Yamamoto, Chiba (JP); Akihiro Ito, Chiba (JP); Masato Tanaka, Chiba (JP); Shinji Morinaga, Chiba (JP); Tetsuya Iwamoto, Chiba (JP)

(73) Assignee: Seiko Precision Inc., Chiba (JP)

( * ) Notice: Subject to any disclaimer, the term of this patent is extended or adjusted under 35 U.S.C. 154(b) by 57 days.

(21) Appl. No.: 10/569,778

(22) PCT Filed: Aug. 27, 2004

(86) PCT No.: PCT/JP2004/012410

§ 371 (c)(1),
(2), (4) Date: Feb. 24, 2006

(87) PCT Pub. No.: WO2005/022730

PCT Pub. Date: Mar. 10, 2005

(65) Prior Publication Data

US 2007/0018513 A1    Jan. 25, 2007

(30) Foreign Application Priority Data

Aug. 29, 2003 (JP) .............................. 2003-306240

(51) Int. Cl.
*H02K 37/14* (2006.01)
*H02K 1/00* (2006.01)

(52) U.S. Cl. .................... 310/49 R; 310/190; 310/191; 310/68 B

(58) Field of Classification Search ............. 310/49 R, 310/190, 191, 68 B
See application file for complete search history.

(56) References Cited

U.S. PATENT DOCUMENTS 4,782,353 A * 11/1988 Ogihara et al. ............. 396/463

| | | | |
|---|---|---|---|
| 5,831,356 A * | 11/1998 | Aoshima | 310/49 R |
| 6,140,731 A * | 10/2000 | Torok et al. | 310/181 |
| 6,316,851 B1 * | 11/2001 | Maegawa et al. | 310/49 R |
| 6,591,066 B2 * | 7/2003 | Aoshima | 396/133 |
| 7,122,920 B2 * | 10/2006 | Mizumaki | 310/49 R |
| 2004/0212274 A1 * | 10/2004 | Mizumaki | 310/254 |
| 2005/0218743 A1 * | 10/2005 | Mizumaki | 310/185 |

FOREIGN PATENT DOCUMENTS

| JP | 58-108762 | | 7/1983 |
|---|---|---|---|
| JP | 2000253602 A | * | 9/2000 |
| JP | 2001258221 A | * | 9/2001 |
| JP | 2002-136095 | | 5/2002 |
| JP | 2003-032991 | | 1/2003 |
| JP | 2005110358 A | * | 4/2005 |

* cited by examiner

*Primary Examiner*—Patrick Assouad
*Assistant Examiner*—Naishadh N Desai
(74) *Attorney, Agent, or Firm*—Honigman Miller Schwartz & Cohn LLP

(57) ABSTRACT

The rotational torque of an electromagnetic actuator having a stator and rotor, such as a stepping motor, is increased.

The electromagnetic actuator includes a rotor (30) having multiple magnetic poles ($Nr_1$, $Nr_2$, $Nr_3$, $Nr_4$, $Nr_5$, $Sr_1$, $Sr_2$, $Sr_3$, $Sr_4$, $Sr_5$) on a circumferential surface (31) and a plurality of stators (10, 20) in an electromagnet form. The stator (10, 20) has a pair of magnetic poles (13, 14, 23, 24) facing the circumferential surface (31) of the rotor (30), and an auxiliary yoke (40, 50) made of a soft magnetic material member extending in a circumferential direction (A) over an angular range ($\gamma 1$, $\gamma 2$) larger than a spread angle ($\alpha$) of the magnetic poles (Nr, Sr) of the rotor (30) in the circumferential direction (A) is provided between the pair of magnetic poles (13, 14, 23, 24).

8 Claims, 10 Drawing Sheets

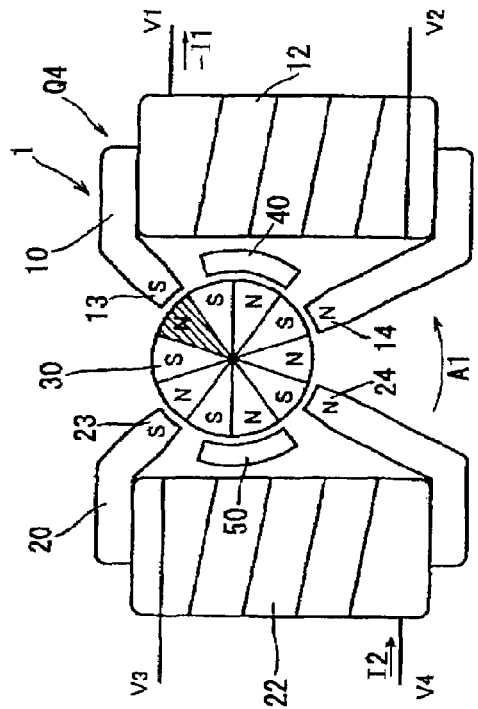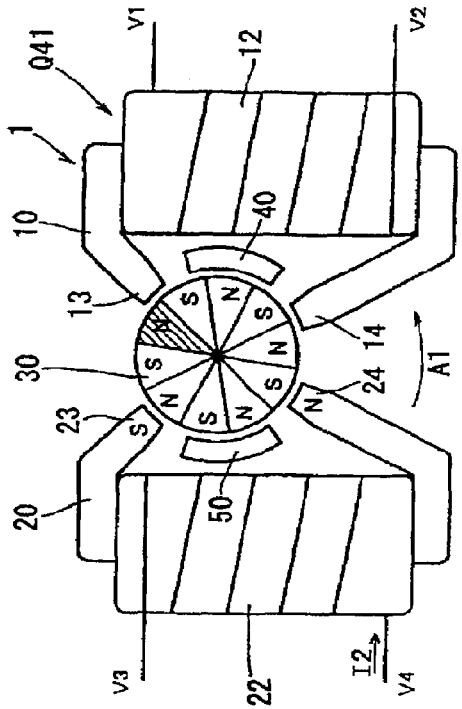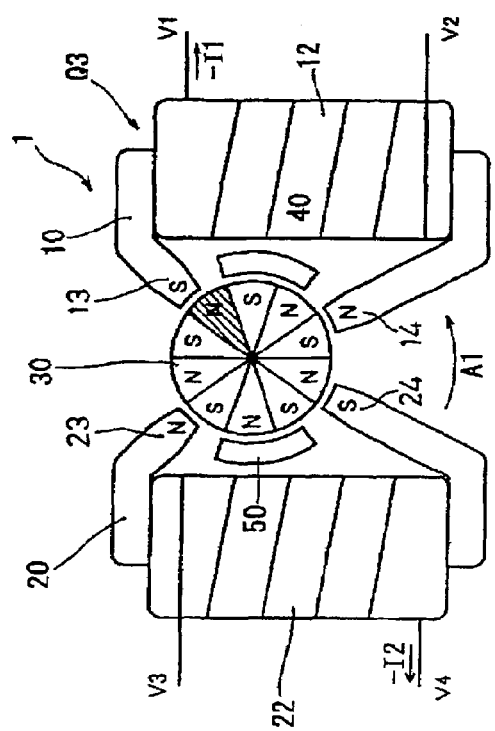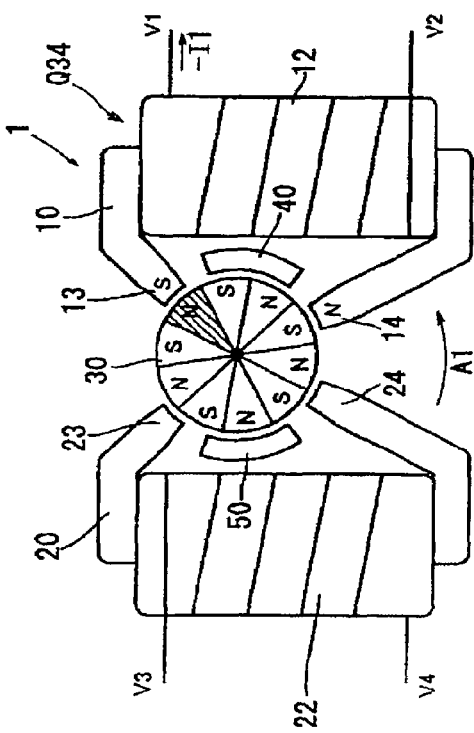

ELECTROMAGNETIC ACTUATOR

TECHNICAL FIELD

The present invention relates to an electromagnetic actuator usable as, for example, a stepping motor.

BACKGROUND ART

It is desirable that a stepping motor which is used for zoom drive or the like of a small camera installed in a portable device should have a small planar size and be thin. In case where it is used in a portable device, the drive source is often a battery and should desirably have a high motor efficiency and low current consumption. When control with high positional precision is desirable as in zoom drive of a camera, the rotor of a stepping motor is made to have multipoles in such a way as to guarantee a relatively high rotational position accuracy, e.g., to be able to designate the rotational position of 20 steps/rotation or so. When a rotor of a small diameter is made to have multipoles, the width of the magnetic poles of the stator that should be selectively made to face the magnetic poles of the rotor becomes smaller, saturation is likely to occur and leakage of the magnetic flux is likely to become large. Further, miniaturization and multipolarization of the rotor make the anisotropy of the shapes of individual electromagnet portions of the rotor non-negligible, and the magnetized states of the individual electromagnet portions of the rotor may become imperfect to call them a permanent magnet.

There has been a proposal to arrange members of a soft magnetic material close to the rotor in order to improve the rotational performance of such a stepping motor or the stop stability in the characteristics at the time of step rotation (Patent Literature 1, Patent Literature 2).

Patent Literature 1: Unexamined Japanese Patent Application KOKAI Publication No. 2003-32991

Patent Literature 2: Unexamined Japanese Patent Application KOKAI Publication No. 2002-136095

DISCLOSURE OF INVENTION

Problem to be Solved by the Invention

However, the prior arts proposed in those Patent Literatures 1 and 2 are the one which has members of a soft magnetic material provided within the range of an angle between the magnetic poles of the rotor or less (typically, about ½ of the angle) for the purpose that the rotor can surely stop at the step rotational position of the rotor by enhancing the magnetostatic stability at the step rotational position (Patent Literature 1) or the one which has members of a soft magnetic material provided within the range of an angle between the magnetic poles of the rotor or less (typically, about ½ of the angle) for the purpose that the rotor is suppressed from excessively pulled to the step rotational position of the rotor (the detent torque is reduced) to make the rotor smoothly rotate by reducing the magnetostatic stability at the step rotational position (Patent Literature 2), and are not intended to improve the rotational torque of the stepping motor.

The present invention has been made in view of the aforementioned points, and it is an object of the invention to provide an electromagnetic actuator capable of enhancing the rotational torque.

Means for Solving the Problem

An electromagnetic actuator according to the present invention comprises a rotor which has multiple magnetic poles on a circumferential surface thereof, and a plurality of stators in an electromagnet form which have at least two magnetic poles facing the circumferential surface of the rotor, wherein an auxiliary yoke extending in a circumferential direction of the magnetic poles of the rotor over an angular range which is larger than a spread angle of the magnetic poles of the rotor in the circumferential direction is provided between the magnetic poles of at least one of the stators.

EFFECT OF THE INVENTION

The present invention can provide an electromagnetic actuator capable of enhancing the rotational torque.

BRIEF DESCRIPTION OF DRAWINGS

[FIG. 5] It illustrates the remaining part of the 1-2-phase excitation rotational movement of the motor in FIG. 1, and FIGS. 5A, 5B, 5C and 5D are exemplary plan explanatory views showing states Q3, Q34, Q4 and Q41 which shift in order.

[FIG. 6] It illustrates modifications (second embodiment) of the stepping motor in FIG. 1.

Figure 1:
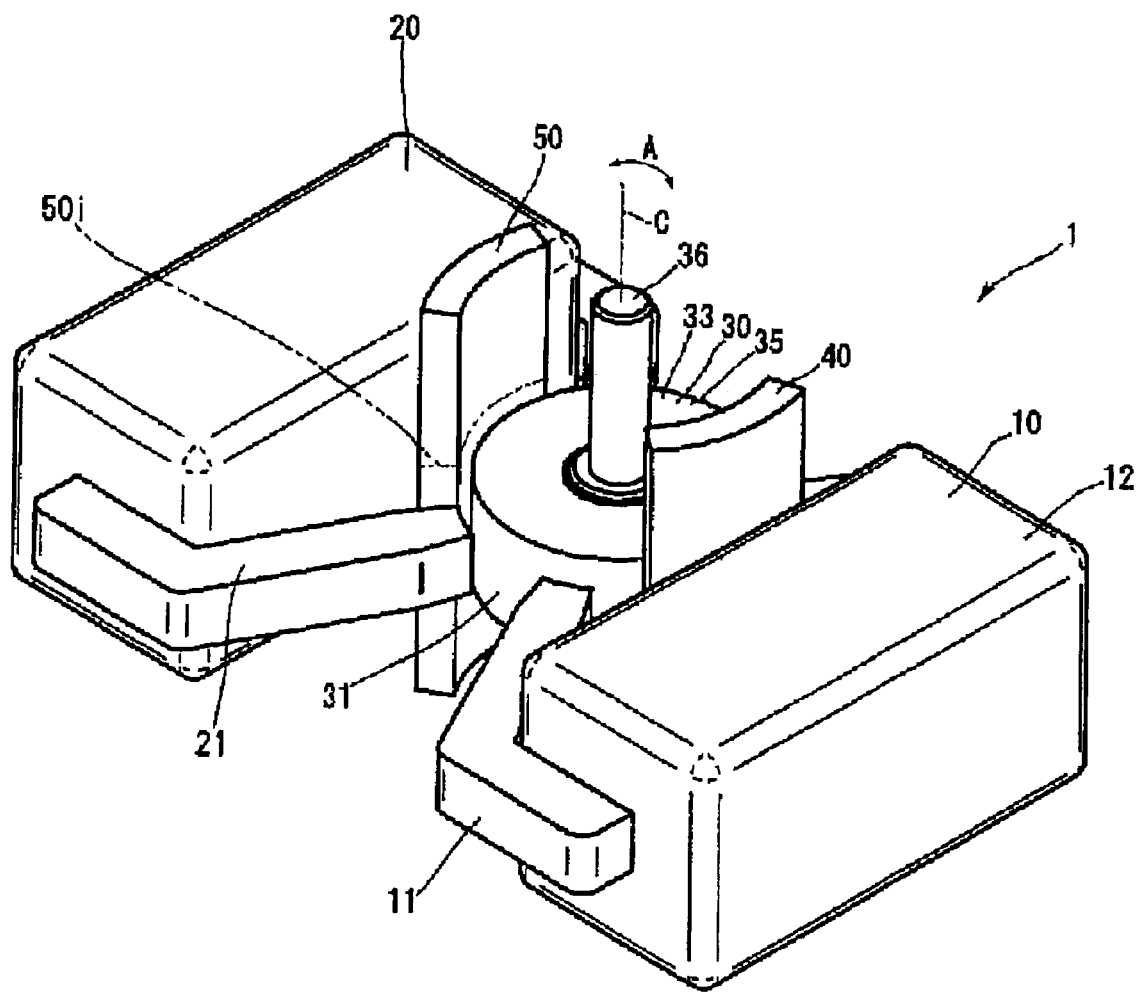
[FIG. 1] It is a perspective explanatory diagram of a stepping motor according to one preferable embodiment of the present invention.

EXPLANATION OF REFERENCE NUMERALS 1, 1a, 1b, 1c stepping motor
5 members of a soft magnetic material (correlation)
10, 10a, 10b stator
11 yoke
12 coil
13, 14 magnetic pole
15, 16 endface
20, 20a, 20b stator
21 yoke
22 coil
23, 24 magnetic pole
25, 26 end face
30, 30a, 30b rotor
31 circumferential surface
33 top surface
35 rotor body
36 rotor shaft (output shaft of motor)
40, 40a, 40b, 50, 50a, 50b, 80, 90 auxiliary yoke (soft magnetic material)
50i imaginary line
41, 42, 51, 52 circumferential-directional both end portions
43, 53 thin portion
44, 54 opening
45, 55 thick portion at axial-directional both end portions
60 stator
61 yoke
62 coil
63, 64 magnetic pole
70 stator
71 yoke
72 coil
73, 74 magnetic pole
A circumferential direction
A1 rotational direction
C center axial line (of rotor)
$G_{11}$, $G_{12}$, $G_{21}$, $G_{22}$ gap (gap between stator magnetic pole and rotor circumferential surface)
g1, g2, g3 gap (gap between auxiliary yoke and rotor circumferential surface)
I1, I2 current
Lr magnetic pole length
Ls, Ls1, Ls2 circumferential-directional length of auxiliary yoke
K1, K2 closed magnetic path
Mc mirror symmetrical center line
Nr, $Nr_1$, $Nr_2$, $Nr_3$, $Nr_4$, $Nr_5$, $Nr_6$, $Nr_7$ N pole (rotor magnetic pole)
Q1, Q12, Q2, Q23, Q3, Q34, Q4, Q41 state of motor
Sr, $Sr_1$, $Sr_2$, $Sr_3$, $Sr_4$, $Sr_5$, $Sr_6$, $Sr_7$ S pole (rotor magnetic pole)
Tr, Ts torque
V1, V2, V3, V4 terminal
α spread angle of rotor magnetic poles (interval between angles of rotor magnetic poles)
β1, β2 interval between angles of adjacent magnetic poles (correlation) of adjacent stator
$βs_{11}$, $βs_{12}$, $βs_{21}$, $βs_{22}$, $βs_p$ spread angle of magnetic poles of stator
$βs_1$, $βs_2$, βs interval between angles of magnetic poles of stator
γ, γ1, γ2, γm spread angle of auxiliary yoke
$κ_1$, $κ_2$ magnetic path between auxiliary yoke and rotor An electromagnetic actuator according to an embodiment of the present invention comprises a rotor which has multiple magnetic poles on a circumferential surface thereof, and a plurality of stators in an electromagnet form which have at least two magnetic poles facing the circumferential surface of the rotor, and an auxiliary yoke extending in a circumferential direction of the magnetic poles of the rotor over an angular range which is larger than a spread angle of the magnetic poles of the rotor in the circumferential direction is provided between the magnetic poles of at least one of the stators.

In the electromagnetic actuator according to the embodiment of the present invention, as the auxiliary yoke extending in a circumferential direction of the magnetic poles of the rotor over an angular range which is larger than a spread angle of the magnetic poles of the rotor in the circumferential direction is provided between the magnetic poles of the stator, the auxiliary yoke so faces the circumferential surface of the rotor as to step over (yoke) the adjoining magnetic poles of the rotor, making it possible to provide a magnetostatic path which yokes the adjoining magnetic poles. Accordingly, as at least a portion of the magnetostatic path which extends from one magnetic pole of the stator to the other magnetic pole of the stator via the rotor is given by the auxiliary yoke (generally made of a soft magnetic material), the intensity of a magnetic field between a gap (magnetic gap) of the front surface of the magnetic poles of the stator can be enhanced, whereby the rotational torque of the rotor, that is, the rotational performance can be improved.

As the auxiliary yoke provides the magnetostatic path between the adjoining magnetic poles of the rotor, the magnetostatical connection of the magnet portions of the rotor whose magnetic poles face the auxiliary yoke contributes to the improvement of the performance.

The rotor is typically magnetized in the radial direction. However, from the viewpoint of the magnetizing technology, the direction and distribution of the magnetization of the inside close to the center may differ from the radial direction. The magnetic poles of the rotor typically spread over the same length or the same angular range as seen in the circumferential direction, and gaps or angles between the adjoining magnetic poles in the circumferential direction are also the same. In some cases, however, both may differ to some extent. In other words, the rotor typically has even magnetic poles, that is, it alternately has the same numbers of the N poles and the S poles, and the spread or the angles of the individual magnetic poles in the circumferential direction are the same, but a slight difference is acceptable. It is preferable that the number of the magnetic poles on the circumferential surface of the rotor be, typically, 10 to 14 poles or so, but it may be less or larger than that in some cases.

The rotor is a permanent magnet type having the magnetic poles on its circumferential surface, and is made of a permanent magnet material, in particular, a permanent magnet with large retentive power, and in general, one so-called a hard magnetic material is suitable. However, as the aspect ratio (the length of the direction of the magnetization/the width (the length in the orthogonal direction)) of the magnetized area corresponding to each surface magnetic pole of the rotor is not always large, the sufficient magnetization may be difficult because of the influence of the demagnetization which depends on the shape of each magnetized area, in which case the intensity or the magnetic flux density of the magnetic pole at the circumferential surface of the rotor can be enhanced by connecting one magnetized area to the other magnetized area in a magnetostatic manner.

The stator is in the form of an electromagnet including a coil for excitation, and comprises a yoke which is made of a soft magnetic material, typically a magnetic material with high permeability and large saturation magnetization like Permalloy, and an excitation coil which magnetizes this yoke. The yoke is formed in a letter "U" or "C" shape, or a similar shape having at least two portions which become the magnetic poles when excited. The magnetic pole portions of the stator are so arranged as to face the circumferential surface of the rotor, via a narrow gap or magnetic-pole-clearance (magnetic pole gap). In this specification, the direction of a pair of foot of "U" itself is not to be specified, and unless otherwise expressly or contextually specified, the "U" shape and the "C" shape are treated as the same shape. In some cases, branches may be so formed as to have, for example, a letter "E" shape as a whole. The magnetic poles of the stator typically spread over half the angular range of the spread angle of the individual magnetic poles of the rotor. In some cases, however, it may be smaller or larger depending on how to carry out the excitation rotation as long as it is equal to or smaller than the spread angle of the magnetic poles of the rotor.

For instance, when the auxiliary yoke of about ½ of the spread angle of each magnetic pole of the rotor is placed between the magnetic poles of the stator, and the spread angles of the magnetic poles of the stator are about ½ of the spread angle of each magnetic pole of the rotor, a gap between the pair of magnetic poles of the stator is typically larger than or equal to 5/2 times the spread angle of the magnetic poles of the rotor, matching the magnetic pole gap of the rotor. That is, when the auxiliary yoke is placed between the magnetic poles of the stator, an angular gap between the magnetic pole of the stator and the adjoining end portion of the auxiliary yoke is typically larger than or equal to ½ times the spread angle of the magnetic pole of the rotor. As long as the magnetic poles of the stator are not and practically directly connected to the adjoining end portions of the auxiliary yoke in a magnetostatic manner, the angular gap between the magnetic poles of the stator and the adjoining end portions of the auxiliary yoke may be small. In other words, as long as a magnetic flux, which flows between the magnetic poles of the stator and the adjoining end portions of the auxiliary yoke, is small enough to be negligible as compared with a magnetic flux which flows between the magnetic poles of the stator and the circumferential surface of the rotor, the angular gap between the magnetic poles of the stator and the adjoining end portions of the auxiliary yoke may be smaller.

In an electromagnetic actuator like a stepping motor, two or more stators are provided. As long as the adjoining stators in the circumferential direction are substantially separated from each other in a magnetostatic manner without intervention of the rotor and the auxiliary yoke, the angular gap between the mutually adjoining magnetic poles of the stators adjoining in the circumferential direction may be substantially equal to 0.

As a way of driving the stator with respect to the excitation coil, 2-phase excitation rotational drive or 1-2-phase excitation rotational drive is typically adapted. Other different excitation rotational movement may be carried out.

Typically, the auxiliary yoke is provided between a pair of magnetic poles of each stator. The auxiliary yoke may be provided between the magnetic poles of one stator among the plurality of stators.

As long as the auxiliary yoke substantially extends in the circumferential direction over the angular range larger than the spread angle of the. magnetic poles of the rotor in the circumferential direction to thereby face both of different magnetic poles (N pole and S pole) on the circumferential surface of the rotor, it may be almost equal to the spread angle of the magnetic pole of the rotor in the circumferential direction, or larger than the spread angle of the magnetic pole of the rotor in the circumferential direction. However, in order to certainly provide a magnetostatic path between different magnetic poles of the rotor which adjoin in the circumferential direction, it is preferable that the auxiliary yoke be larger than or equal to 3/2 times the spread angle of the magnetic poles of the rotor in the circumferential direction. To suppress the angle between a pair of magnetic poles of the stator to a certain range, it is preferable that the auxiliary yoke should not be excessively large with respect to the spread angle of the magnetic poles of the rotor in the circumferential direction.

As mentioned in the above explanation for the arrangement of the stator, it is necessary to avoid the direct and magnetostatic contact of the stator and the auxiliary yoke, and, in order to do so, the end portions of the auxiliary yoke in the circumferential direction should be away from the magnetic poles of the stator by a certain distance, and preferably, it should be kept as apart by ½ of the spread angle of the magnetic pole of the rotor in the circumferential direction or greater. To minimize the magnet resistance of the magnetostatic path between a pair of magnetic poles of the stator at a portion other than the front magnetic gap portions of the magnetic poles of the stator, however, it is preferable that the end portions of the auxiliary yoke be in a close proximity to the adjoining magnetic poles of the stator as long as the auxiliary yoke do not directly contact the stator in a magnetostatic manner. The end portions of the stator are arranged at a gap of about ½ of the spread angle of the magnetic poles of the rotor in the circumferential direction with respect to the adjoining magnetic poles of the stator. In some cases, as long as it is possible to avoid substantial formation of the short-circuited magnetostatic path between the auxiliary yoke and the stator, the auxiliary yoke and the stator may be integrally connected with each other via a portion with a small cross sectional area (this portion is to be magnetically saturated) to allow the auxiliary yoke and the stator, which are integrated parts mechanically, to function as if they were magnetically separated.

The auxiliary yoke is arranged in a close proximity to the circumferential surface of the rotor via a gap with substantively the same size as the gap (magnetic gap) between the magnetic poles of the stator and the circumferential surface of the rotor, so that it can be magnetostatically connected between the circumferential surface of the rotor and the areas facing the circumferential surface of the rotor. The auxiliary yoke, however, may be so provided as to have a small gap between the rotor and one portion facing one magnetic pole, a small gap between the rotor and another portion facing another adjoining magnetic pole (S pole or N pole), and a connecting portion or joining portion having a low magnetic resistance between one portion and another portion, so that a magnetostatic path extending in the circumferential direction can be provided between one magnetic pole (N pole or S pole) of the rotor facing the auxiliary yoke, and another adjoining magnetic pole (S pole or N pole) different from the one magnetic pole. In this case, the auxiliary yoke may be substantially apart from the circumferential surface of the rotor at other portions than two portions, namely, one portion of the auxiliary yoke and another portion thereof. For instance, there may be a groove or a cutaway, extending in parallel to the axial direction between both end portions of the auxiliary yoke in the circumferential direction, or there may be an opening between both end portions of the auxiliary yoke in the circumferential direction. The auxiliary yoke may have a larger axial-directional length or nearly the same axial-directional length as compared with the axial-directional thickness of the disk-like rotor, and it may have a shorter axial-directional length than the axial-directional thickness of the rotor as long as it is strongly magnetostatically connected to the magnetic pole of the circumferential surface.

The auxiliary yoke is made of a soft magnetic material so as to provide a magnetostatic path with a low magnet resistance, and preferably, a high-permeability material should be used.

Next, preferable embodiments of the present invention will now be explained with reference to the accompanying drawings.

First Embodiment

Figure 2:
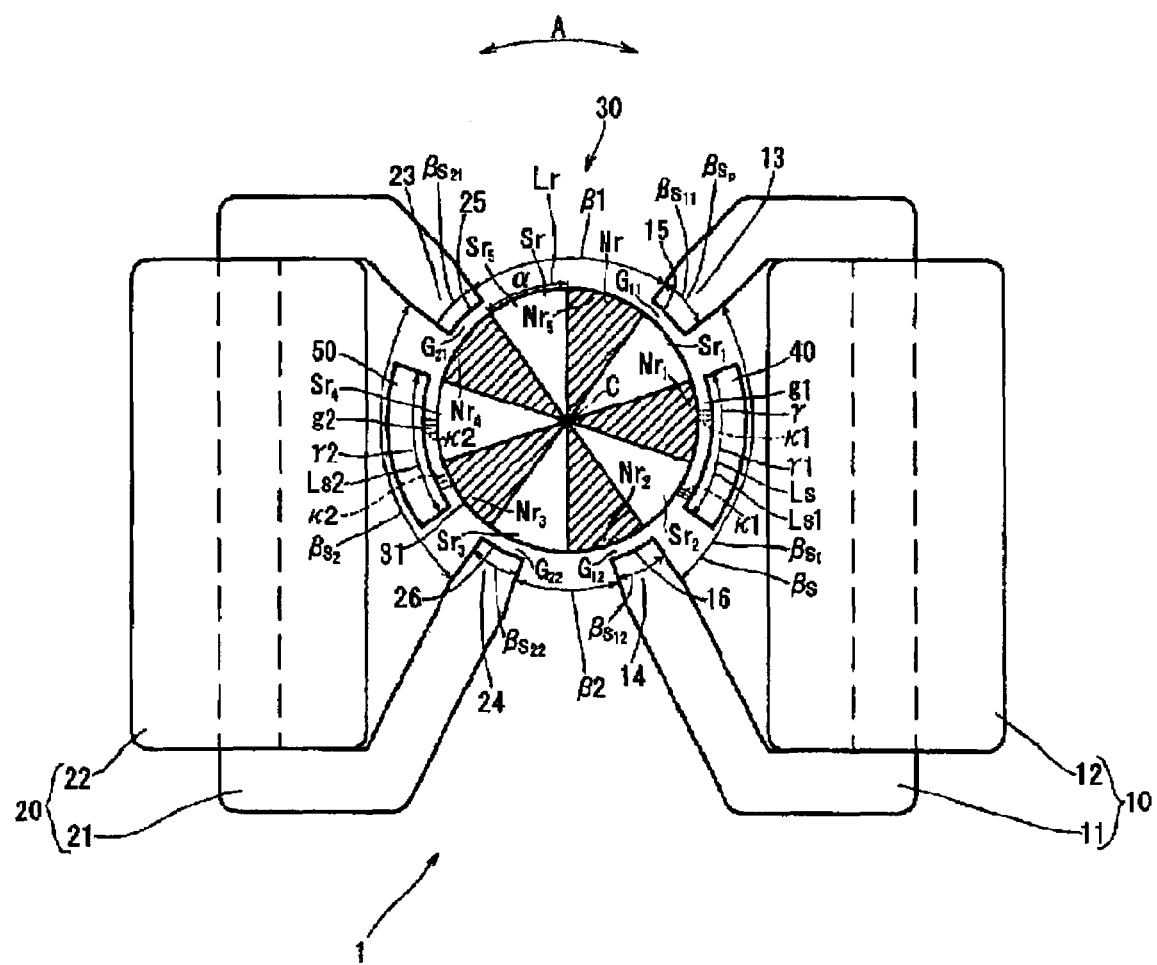
[FIG. 2] It is an exemplary plan explanatory view of the stepping motor in FIG. 1.

A stepping motor 1 of the first embodiment according to the present invention is illustrated in FIGS. 1 and 2. The stepping motor 1 comprises two sets of stators 10 and 20, a rotor 30, and auxiliary stators or auxiliary yokes 40, 50 which are made of a soft magnetic material.

The rotor 30 has an approximately disk-like or annular plate shape. It comprises a permanent magnet structure in which ten magnetic poles magnetized on its circumferential surface 31 at substantively equal intervals in the radial direction. In FIG. 2, the circumferential surfaces of areas $Nr_1$ to $Nr_5$ (denoted by reference numeral Nr when they are not mutually distinguished or generically referred to) are so magnetized as to be N poles, and the circumferential surfaces of the remaining areas $Sr_1$ to $Sr_5$ (denoted by reference numeral Sr when they are not mutually distinguished or generically referred to) are so magnetized as to be S poles. In the exemplary diagram of FIG. 2, however, the purpose is to easily illustrate that N and S poles alternately appear in the circumferential surface 31 at substantively equal intervals, i.e., to distinguish the magnetized states on the circumferential surface 31 and in the vicinity thereof, but this exemplary diagram does not strictly define the internal magnetized states in the radial direction. As illustrated in the perspective view of FIG. 1, the rotor 30 typically comprises a rotor body 35 of an annular plate shape, and a rotor shaft (motor output shaft) 36 over which the rotor body 35 of the annular plate shape is fitted. The rotor body may be formed integral with the rotor shaft.

The stator 10 comprises a yoke 11 made of a soft magnetic material of a "U" shape or a "C" shape, and a stator coil 12, and magnetic poles 13 and 14 at both ends of the yoke 11 are position in a close proximity to the circumferential surface 31 of the rotor 30 via narrow gaps $G_{11}$ and $G_{12}$. The spread angle of front end surfaces 15 and 16 of the magnetic poles 13 and 14 along the circumferential direction A (the angle viewed from the center of the rotor) are $\beta s_p$ ($\beta s_{11}$, $\beta s_{12}$), and are substantively ½ of the spread angle $\alpha$ of one of the magnetic poles N and S, of the rotor 30. The open angle $\beta s_1$, between the magnetic poles 13 and 14 in the circumferential direction A is 5⁄2 of the spread angle $\alpha$ of the magnetic pole of the rotor 30, and two magnetic poles 13 and 14 face the opposite magnetic poles Nr and Sr, or Sr and Nr of the rotor 30, regardless of the rotational position of the rotor 30.

As the stator 20 is structured in the same way as the stator 10, its detailed explanation will be omitted.

The spread angle $\beta_1$ between the magnetic pole 13 of the stator 10 and the magnetic pole 23 of the stator 20 in the circumferential direction A is twice as much as the spread angle $\alpha$ of the rotor 30 (the relative angular gap of the magnetic poles 13 and 23 is $5\alpha/2$). The gap $\beta_2$ between the magnetic pole 14 of the stator 10 and the magnetic pole 24 of the stator 20 in the circumferential direction A is one times the spread angle $\alpha$ of the rotor 30 (the relative angular gap of the magnetic poles 14, 24 is $3\alpha/2$). Accordingly, in the 2-phase excitation rotational movement to be discussed later, for example, two magnetic poles 13 and 14 repeat facing the opposite magnetic poles Nr and Sr or Sr and Nr of the rotor 30 every time the rotor 30 makes 1⁄20 rotation twice, and two magnetic poles 23 and 24 also repeat facing the opposite magnetic poles Nr and Sr or Sr and Nr of the rotor 30 every time the rotor 30 makes 1⁄20 rotation twice.

The auxiliary yoke 40 comprises a partly cylindrical body, and faces the circumferential surface 31 of the rotor 30 via a gap g1 between the magnetic poles 13 and 14 of the stator 10. The spread angle $\gamma$ ($\gamma$1) of the auxiliary yoke 40 in the circumferential direction A is 3⁄2 times the spread angle $\alpha$ of the magnetic poles Nr and Sr of the rotor 30, in other words, the length Ls (Ls1) of the auxiliary yoke 40 in the circumferential direction A is 3⁄2 times the magnetic pole length Lr of the rotor 30, provided that the gap g1 is of a negligible size.

Accordingly, the auxiliary yoke 40 faces two magnetic poles Nr and Sr, adjoining in the circumferential direction A of the rotor 30, in the radial direction at an arbitrary point of time. As a result, the auxiliary yoke 40 is formed with a path of a magnetic flux (magnetostatic path) $\kappa$1 which enters the auxiliary yoke 40 from the magnetic pole Nr facing the rotor 30, passes through the inside of the auxiliary yoke 40, and then returns to the magnetic pole Sr of the rotor 30 facing the auxiliary yoke 40 from the auxiliary yoke 40.

The auxiliary yoke 40 is so arranged as to be at the equal intervals from the magnetic poles 13 and 14 of the stator 10, and in this embodiment, it is separated from the magnetic poles 13 and 14 of the stator 10 by the angle of $\gamma$/2 (the circumferential distance of Ls/2).

The auxiliary yoke 50 has the same structure as the auxiliary yoke 40, and thus its detailed explanation will be omitted.

The operation when the stepping motor 1 constructed in the above manner takes a 2-phase excitation rotation will be described based on FIG. 3.

Figure 3A:
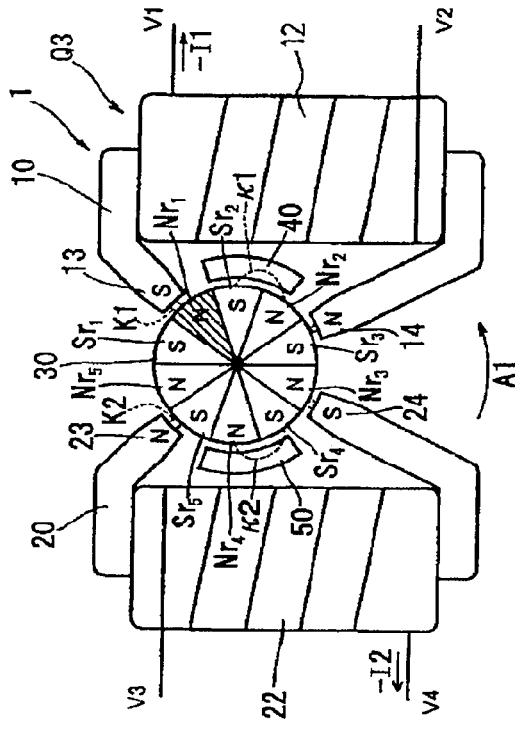
[FIG. 3] It illustrates the 2-phase excitation rotational movement of the motor in FIG. 1, and FIGS. 3A, 3B, 3C and 3D are exemplary plan explanatory views showing states Q1, Q2, Q3 and Q4 which shift in order.

FIG. 3A shows a state Q1 where terminals V1 and V2 of the stator 10 are respectively set to positive and negative, and a current I1 is let to flow in the coil 12 so that the magnetic poles 13 and 14 are so magnetized as to be the N pole and S pole, respectively, while terminals V3 and V4 of the stator 20 are respectively set to negative and positive, and a current I2 is let to flow in the coil 22 so that the magnetic poles 23 and 24 are respectively magnetized to the S pole and N pole.

In the state Q1 in FIG. 3A, the first half portion of the magnetic pole $Sr_1$ of the rotor 30 in the A1 direction and the first half portion of the magnetic pole $Nr_2$ in the A1 direction, and the second half portion of the magnetic pole $Nr_4$ of the rotor 30 in the A1 direction and the second half portion of the magnetic pole $Sr_3$ in the A1 direction are attracted to the facing magnetic poles of the stators 10 and 20 in such a state where the first half portion of the magnetic pole $Sr_1$ and the first half portion of the magnetic pole $Nr_2$ respectively face the magnetic pole 13 magnetized to the N pole and the magnetic pole 14 magnetized to the S pole in the stator 10, and the second half portion of the magnetic pole $Nr_4$ and the second half portion of the magnetic pole $Sr_3$ respectively face the magnetic pole 23 magnetized to the S pole and the magnetic pole 24 magnetized to the N pole in the stator 20. Although the following description is given on the assumption that the magnetic pole $Sr_1$ is facing the magnetic pole 13 of the stator 10, it is apparent that the same is true of any of the other magnetic poles $Sr_2$, $Sr_3$, $Sr_4$ and $Sr_5$ in place of the magnetic pole $Sr_1$ due to the rotational symmetry.

In the state Q1, the entire magnetic pole $Nr_1$ and a part of the magnetic pole $Sr_2$ of the rotor 30 face the auxiliary yoke 40, and a magnetic path κ1 which leaves the magnetic pole $Nr_1$ of the rotor 30, passes the auxiliary yoke 40 and returns to the magnetic pole $Sr_2$ is formed between the rotor 30 and the auxiliary yoke 40. Regarding the stator 10, therefore, a substantial portion of the magnetic flux of a closed magnetic path K1 which enters the facing magnetic pole $Sr_1$ of the rotor from the magnetic pole (N pole) 13 through a gap $G_{11}$, passes through the magnetic pole $Nr_2$ of the rotor, then returns to the magnetic pole (S pole) 14 of the stator 10 through a gap $G_{12}$ is given by the auxiliary yoke 40 of a soft magnetic material. As compared with a case where there is no auxiliary yoke 40, therefore, the magnetic resistance of the closed magnetic path K1 is reduced considerably. As a result, the intensities of the magnetic fields at the front gaps $G_{11}$ and $G_{12}$ of the magnetic poles 13 and 14 of the stator 10 according to the current I1 are enhanced, thereby increasing the magnetostatic attraction with respect to the magnetic poles $Sr_1$ and $Nr_2$ of the rotor 30.

Likewise, in the state Q1, a part of the magnetic pole $Nr_3$ and the entire magnetic pole $Sr_4$ of the rotor 30 face the auxiliary yoke 50, and a magnetic path κ2 which leaves the magnetic pole $Nr_3$ of the rotor 30, passes the auxiliary yoke 50 and returns to the magnetic pole $Sr_4$ is formed between the rotor 30 and the auxiliary yoke 50. Regarding the stator 20, therefore, a substantial portion of the magnetic flux of a closed magnetic path K2 which enters the facing magnetic pole $Sr_3$ of the rotor from the magnetic pole (N pole) 24 through a gap $G_{22}$, passes through the magnetic pole $Nr_4$ of the rotor 30, then returns to the magnetic pole (S pole) 23 of the stator 20 is given by the auxiliary yoke 50 of a soft magnetic material. As compared with a case where there is no auxiliary yoke 50, therefore, the magnetic resistance of the closed magnetic path K2 is reduced considerably. As a result, the intensities of the magnetic fields at the front gaps $G_{22}$ and $G_{21}$ of the magnetic poles 24 and 23 according to the current I2 are increased, so that the magnetostatic attraction with respect to the magnetic poles $Sr_3$ and $Nr_4$ of the rotor 30 can be increased.

The increase in magnetostatic attraction can enhance the magnetostatic stability of the rotor 30 of the stepping motor 1 in the state Q1. In other words, it also means that the rotor 30 is kept stopped surely at the rotational position in the state Q1.

Figure 3C:
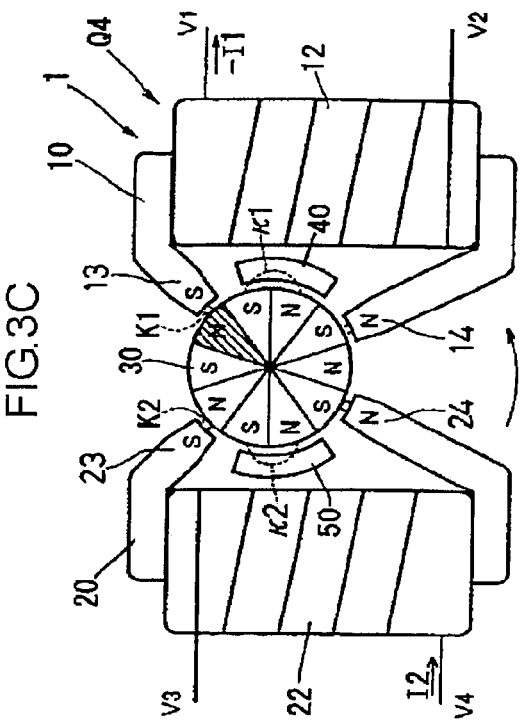
Figure 3B:
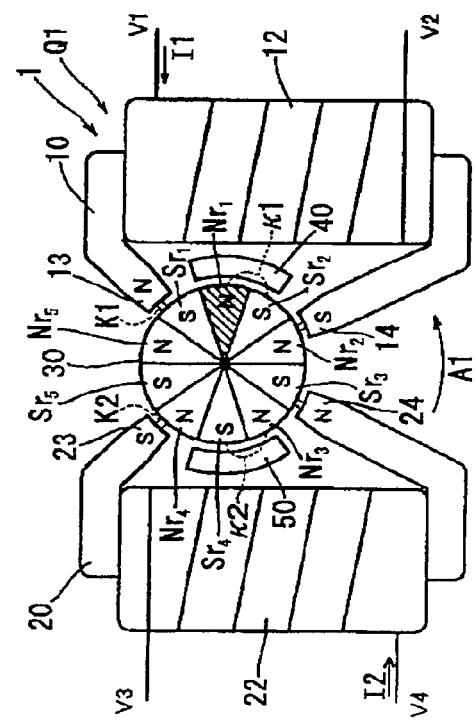

At the next step, as shown in FIG. 3B, with the state of the stator 10 left unchanged, the positive and negative states of the terminals V3 and V4 of the coil 22 of the stator 20 are inverted to be positive and negative, respectively, and a current −I2 is let to flow in the coil 22 to bring about a state Q2 where the magnetic poles 23 and 24 are so magnetized as to be the N pole and the S pole, respectively.

In the state Q2, the magnetic poles 23 and 24 respectively change to the N pole and the S pole. The magnetic pole $Sr_5$ of the rotor 30 is attracted to the magnetic pole 23, and the magnetic pole $Nr_3$ of the rotor is attracted to the magnetic pole 24, so that the rotor 30 rotates by 1/20 in the A1 direction and takes a position as shown in FIG. 3B.

In the state Q2, a part of the magnetic pole $Nr_1$ and the entire magnetic pole $Sr_2$ of the rotor 30 face the auxiliary yoke 40, and the magnetic path κ1 which leaves the magnetic pole $Nr_1$ of the rotor 30, passes the auxiliary yoke 40 and returns to the magnetic pole $Sr_2$ is formed between the rotor 30 and the auxiliary yoke 40. Regarding the stator 10, therefore, a substantial portion of the magnetic flux of the closed magnetic path K1 which enters the facing magnetic pole $Sr_1$ of the rotor 30 from the magnetic pole (N pole) 13 through the $G_{11}$, passes through the magnetic pole $Nr_2$ of the rotor, then returns to the magnetic pole (S pole) 14 of the stator 10 through the gap $G_{12}$ is given by the auxiliary yoke 40 of a soft magnetic material. As compared with a case where there is no auxiliary yoke 40, therefore, the magnetic resistance of the closed magnetic path K1 can be reduced considerably. As a result, the intensities of the magnetic fields at the front gaps $G_{11}$ and $G_{12}$ of the magnetic poles 13 and 14 of the stator 10 according to the stator current I1 are enhanced, so that the magnetostatic attraction with respect to the magnetic poles $Sr_1$ and $Nr_2$ of the rotor 30 can be increased. The action of the magnet portion facing the auxiliary yoke 40 of the rotor 30 is the same as the one mentioned above.

Likewise, in the state Q2, a part of the magnetic pole $Nr_3$ and the entire magnetic pole $Sr_4$ of the rotor 30 face the auxiliary yoke 50, and the magnetic path κ2 which leaves the magnetic pole $Nr_4$ of the rotor 30, passes the auxiliary yoke 50 and returns to the magnetic pole $Sr_4$ is formed between the rotor 30 and the auxiliary yoke 50. Regarding the stator 20, therefore, a substantial portion of the magnetic flux of the closed magnetic path K2 which enters the facing magnetic pole $Sr_5$ of the rotor from the magnetic pole (N pole) 23 through the gap $G_{21}$, passes through the magnetic pole $Nr_3$ of the rotor, then returns to the magnetic pole (S pole) 24 of the stator 20 is given by the auxiliary yoke 50 of a soft magnetic material. As compared with a case where there is no auxiliary yoke 50, therefore, the magnetic resistance of the closed magnetic path K2 can be reduced considerably. As a result, the intensities of the magnetic fields at the front gaps $G_{21}$ and $G_{22}$ of the magnetic poles 23 and 24 of the stator 20 according to the stator current −I2 are increased, so that the magnetostatic attraction with respect to the magnetic poles $Sr_5$ and $Nr_3$ of the rotor 30 can be increased. The action of the magnet portion facing the auxiliary yoke 50 of the rotor 30 is the same as the one mentioned above.

Such an increase in magnetostatic attraction can enhance the magnetostatic stability of the rotor 30 of the stepping motor 1 in the state Q2. In other words, it also means that the rotor 30 is kept stopped surely at the rotational position in the state Q2.

Paying attention to the rotation of the rotor 30 from the state Q1 to the state Q2, the rotational torque is increased by the intensities of the magnetic fields at the magnetic gaps (clearances) $G_{11}$, $G_{12}$, $G_{21}$ and $G_{22}$ caused by reduction in magnetic resistances of the closed magnetic paths K1 and K2 by the provision of the auxiliary yokes 40 and 50.

At the next step, as shown in FIG. 3C, with the state of the stator 20 left unchanged, the positive and negative states of the terminals V1 and V2 of the coil 12 of the stator 20 are inverted to be negative and positive, respectively, and a current −I1 is let to flow in the coil 12 to bring about a state Q3 where the magnetic poles 13 and 14 are so magnetized as to be the S pole and the N pole, respectively.

In the state Q3, the magnetic pole $Sr_3$ of the rotor 30 is attracted to the magnetic pole 14 which has changed to the N pole, and the magnetic pole $Nr_1$ of the rotor is attracted to the magnetic pole 13 which has changed to the S pole, so that the rotor 30 rotates by 1/20 in the A1 direction and takes a position as shown in FIG. 3C.

In the state Q3, a part of the magnetic pole $Nr_2$ and the entire magnetic pole $Sr_2$ of the rotor 30 face the auxiliary yoke 40, and the magnetic path κ1 which leaves the magnetic pole $Nr_2$ of the rotor 30, passes the auxiliary yoke 40 and returns to the magnetic pole $Sr_2$ is formed between the rotor 30 and the auxiliary yoke 40. Regarding the stator (magnet) 10, therefore, a substantial portion of the closed magnetic path K1 which enters the facing magnetic pole $Sr_3$ of the rotor magnet 30 from the magnetic pole (N pole) 14 through the $G_{12}$, passes through the magnetic pole $Nr_1$ of the rotor magnet 30, then returns to the magnetic pole (S pole) 13 of the stator (magnet) 10 through the gap $G_{11}$ is given by the auxiliary yoke 40 of a soft magnetic material. As compared with a case where there is no auxiliary yoke 40, therefore, the magnetic resistance of the closed magnetic path K1 can be reduced considerably. As a result, the intensities of the magnetic fields at the front gaps $G_{11}$ and $G_{12}$ of the magnetic poles 13 and 14 of the stator 10 according to the stator current −I1 are enhanced, so that the magnetostatic attraction with respect to the magnetic poles $Nr_1$ and $Sr_3$ of the rotor 30 can be increased.

Likewise, in the state Q3, a part of the magnetic pole $Sr_3$ and the entire magnetic pole $Nr_4$ of the rotor 30 face the auxiliary yoke 50, and the magnetic path κ2 which leaves the magnetic pole $Nr_4$ of the rotor 30, passes the auxiliary yoke 50 and returns to the magnetic pole $Sr_4$ is formed between the rotor 30 and the auxiliary yoke 50. Regarding the stator (magnet) 20, therefore, a substantial portion of the closed magnetic path K2 which enters the facing magnetic pole $Sr_5$ of the rotor (magnet) 30 from the magnetic pole (N pole) 23 through the gap $G_{21}$, passes through the magnetic pole $Nr_3$ of the rotor (magnet) 30, then returns to the magnetic pole (S pole) 24 of the stator (magnet) 20 is given by the auxiliary yoke 50 of a soft magnetic material. As compared with a case where there is no auxiliary yoke 50, therefore, the magnetic resistance of the closed magnetic path K2 can be reduced considerably. As a result, the intensities of the magnetic fields at the front gaps $G_{21}$ and $G_{22}$ of the magnetic poles 23 and 24 of the stator 20 according to the stator current −I2 are increased, so that the magnetostatic attraction with respect to the magnetic poles $Sr_5$ and $Nr_3$ of the rotor 30 can be increased.

Such an increase in magnetostatic attraction can enhance the magnetostatic stability of the rotor 30 of the stepping motor 1 in the state Q3. In other words, it also means that the rotor 30 is kept stopped surely at the rotational position in the state Q3.

Meanwhile, paying attention to the rotation of the rotor 30 from the state Q2 to the state Q3, the rotational torque is increased by the intensities of the magnetic fields at the magnetic gaps (clearances) $G_{11}$, $G_{12}$, $G_{21}$ and $G_{22}$ caused by reduction in magnetic resistances of the closed magnetic paths K1 and K2 by the provision of the auxiliary yokes 40 and 50.

Figure 3D:
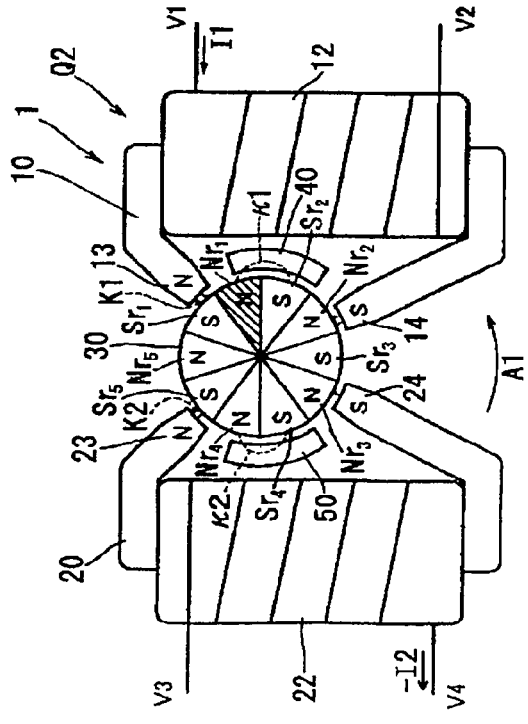

Likewise, at the next step, as shown in FIG. 3D, with the state of the stator 10 left unchanged, the positive and negative states of the terminals V3 and V4 of the coil 22 of the stator 20 are inverted to be negative and positive, respectively, and the current I2 is let to flow in the coil 22 to bring about a state Q4 where the magnetic poles 23 and 24 of the stator 20 are so magnetized as to be the S pole and the N pole, respectively. Accordingly, the rotor 30 is further rotated by 1/20. Even in this case, both of the rotational torque in the A1 direction from the state Q3 to the state Q4 and the magnetostatic stability of the state Q4 can be enhanced because of the same reason as mentioned above.

Further, at the next step, as shown in FIG. 3A, with the state of the stator 20 left unchanged, the positive and negative states of the terminals V1 and V2 of the stator 10 are inverted to be positive and negative, respectively, and the current I1 is let to flow in the coil 12 to bring about the state Q1 where the magnetic poles 13 and 14 are so magnetized as to be the S pole and the N pole, respectively. Accordingly, the rotor 30 is further rotated by 1/20. Even in this case, both of the rotational torque in the A1 direction from the state Q4 to the state Q1 and the magnetostatic stability of the state Q1 can be enhanced because of the same reason as mentioned above.

Thereafter, the states Q2, Q3, Q4 and Q1 are repeated cyclically and the rotor 30 is rotated in the A1 direction. Accordingly, both the rotational torque and the magnetostatic stability at the step rotational position of the motor 1 having the auxiliary yokes 40 and 50 are improved.

TEST EXAMPLES

For the stepping motor 1 shown in FIGS. 1 and 2, a case where the 2-phase excitation rotational movement is made as shown in FIG. 3 was simulated using magnetic field analysis. The simulation conditions and results are as follows.

Simulation Conditions

1. About Rotor 30

(1) Shape: Annular Shape as Shown in FIG. 1
    Outside diameter: 3 mm, inside diameter: 0.6 mm, thickness: 1.2 mm (equivalent to the aspect ratio of 1.3 to 6.4 or so on the assumption that a magnetized area is formed in the radial direction)

(2) Magnetic Conditions
    Adapted material: SmFeN-based bonded magnet
    Maximum energy product: (BH)max=111.4 kJ/m³
    Magnetization direction: radial direction
    Magnetization distribution (magnetic flux density distribution at the circumferential surface 31): sin 5θ (θ is an angle with the center of the magnetic pole area as the origin)

2. About Stators 10 and 20

(1) Magnetic Conditions of Yokes 11 and 21
    Adapted material: 45 permalloy
    Relative permeability: μm=45000
    Coercive force: Hc=10 A/m
    Flux density B at a magnetic field of 1000 A/m=1.4 T (2) Excitation Conditions of Coils 12 and 22
    Coil excitation at each phase: 55 AT 3. About Auxiliary Yokes 40 and 50

(1) Magnetic Conditions
    Adapted material: 45 permalloy
    Relative permeability: μm=45000
    Antimagnetic field: Hc=10 A/m
    Flux density B at a magnetic field of 1000 A/m=1.4 T 4. About the General Outer Shape
    Width (X-directional length): about 10 mm, depth (Y-directional length): about 6.6 mm, height: about 2.7 mm Simulation Results 1. The torque at the time the rotor 30 rotates counterclockwise by 36 degrees from the state Q1 in FIG. 3A to the state Q3 in FIG. 3C is acquired for both of the motor 1 (simulation model) as shown in FIGS. 1 and 2 and the conventional motor (Comparative Example) that is the motor 1 with the auxiliary yokes 40 and 50 removed therefrom. At individual states, a torque Ts for the simulation model is shown in FIG.

13 with a torque Tr for the motor of the Comparative Example taken as a reference (relative value of 1).

Figure 13:
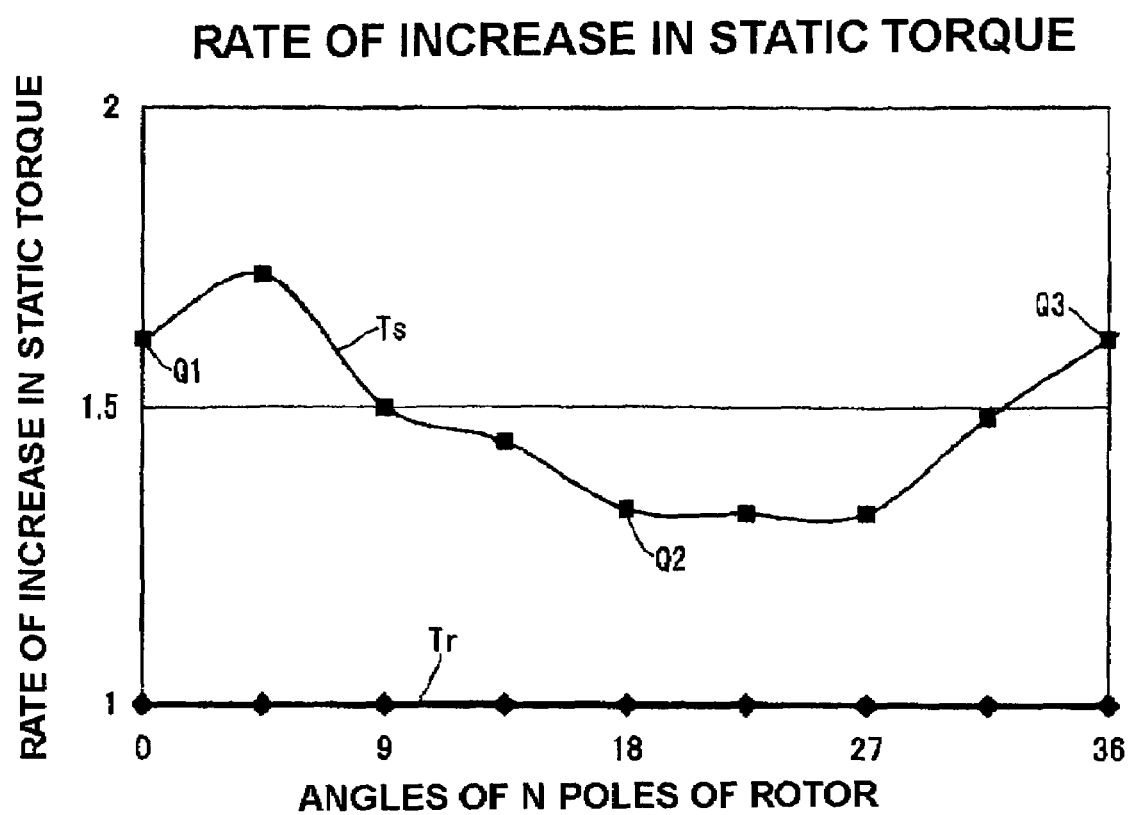
[FIG. 13] It is a graph showing a change in torque when the 2-phase excitation rotational movement of the stepping motor in FIG. 1 as in FIG. 3 is performed.

2. As apparent from FIG. 13, the torque of the motor 1 of the test example equipped with the auxiliary yokes 40 and 50 is increased by about 1.3 to 1.7 times the torque of the conventional motor which does not have the auxiliary yokes.

Figure 4A:
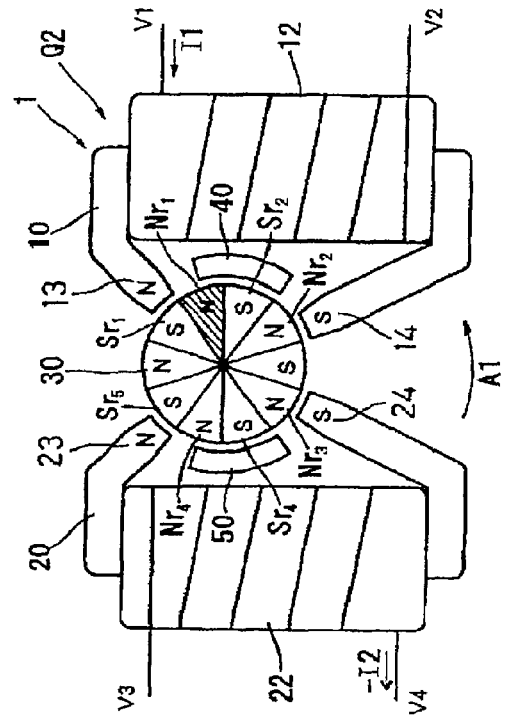
[FIG. 4] It illustrates a part of the 1-2-phase excitation rotational movement of the motor in FIG. 1, and FIGS. 4A, 4B, 4C and 4D are exemplary plan explanatory views showing states Q1, Q12, Q2 and Q23 which shift in order.

Regarding FIG. 3, an example where 2-phase excitation rotation is made has been described. Of course, 1-2-phase excitation may be carried out instead as shown in FIGS. 4 and 5. In FIG. 4A, the rotational position of the rotor 30 are the same as that in FIG. 3A.

In FIG. 4A, the motor 1 is in the state Q1 quite the same as that in FIG. 3A. Therefore, the description about FIG. 3A is directly applied to the motor 1 in the state Q1 in FIG. 4A.

Figure 4C:
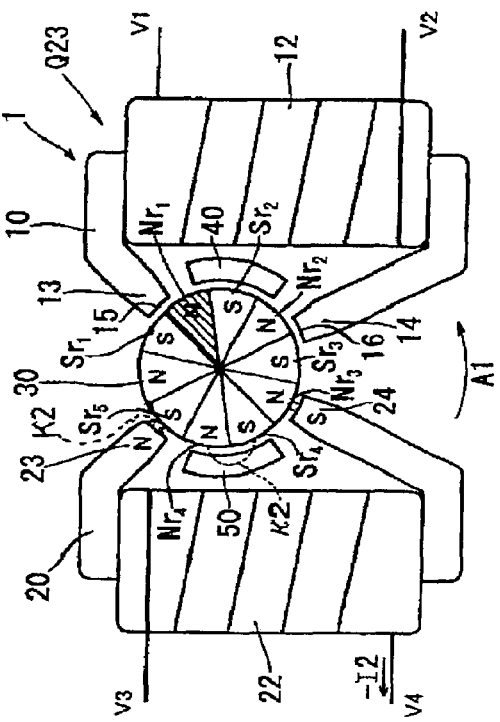
Figure 4B:
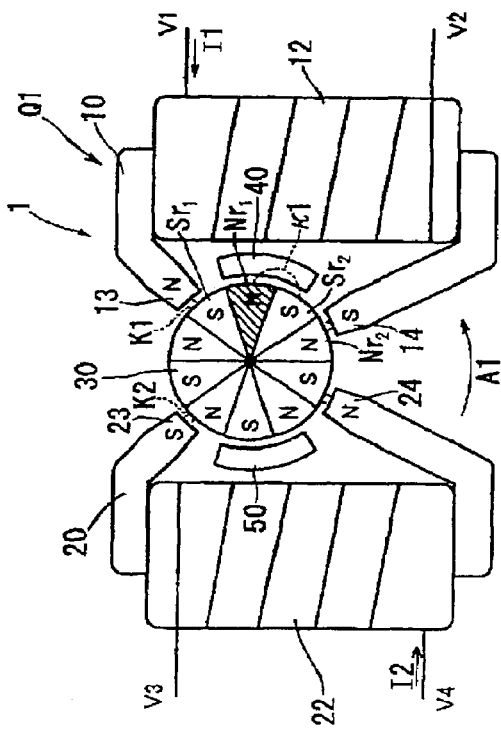

Next, as shown in FIG. 4B, energization to the coil 22 of the stator 20 is stopped to cancel the excitation of the stator 20. In this state, the center portion of the magnetic pole $Sr_1$ of the rotor 30 which has large magnetization directly faces the magnetic pole (N pole) 13 of the stator 10 in the radial direction, and the center portion of the magnetic pole $Nr_2$ of the rotor 30 which has large magnetization directly faces the magnetic pole (S pole) 14 of the stator 10 in the radial direction. The rotor 30 takes a state Q12 where it is rotated from the state Q1 by 1/40 in the A1 direction. At this time, the magnetic poles 23 and 24 at both ends of the stator 20 directly face the boundary portions of the N poles and the S poles of the rotor 30, respectively.

About 2/3 of the magnetic pole $Nr_1$ and about 2/3 of the magnetic pole $Sr_2$ of the rotor 30 face the auxiliary yoke 40, and a magnetic path κ1 which leaves the magnetic pole $Nr_1$ of the rotor 30, passes the auxiliary yoke 40 and returns to the magnetic pole $Sr_2$ is formed. Regarding the stator 10, therefore, a substantial portion of the magnetic flux of a closed magnetic path K1 which enters the facing magnetic pole $Sr_1$ of the rotor from the magnetic pole (N pole) 13 through a gap $G_{11}$, passes through the magnetic pole $Nr_2$ of the rotor, then returns to the magnetic pole (S pole) 14 of the stator 10 through a gap $G_{12}$ is given by the auxiliary yoke 40 of a soft magnetic material. As compared with a case where there is no auxiliary yoke 40, therefore, the magnetic resistance of the closed magnetic path K1 is reduced considerably. As a result, the intensities of the magnetic fields at the front gaps $G_{11}$ and $G_{12}$ of the magnetic poles 13 and 14 of the stator 10 according to the stator current I1 are enhanced, so that the magnetostatic attraction with respect to the magnetic poles $Sr_1$ and $Nr_2$ of the rotor 30 can be increased.

Meanwhile, in the state Q12, about 1/4 of the magnetic pole $Nr_4$, about 1/4 of the magnetic pole $Nr_3$ and the magnetic pole $Sr_4$ of the rotor 30 face the auxiliary yoke 50.

The aforementioned increase in magnetostatic attraction between the stator 10 and the rotor 30 can enhance the magnetostatic stability of the rotor 30 of the stepping motor 1 in the state Q12. In other words, it also means that the rotor 30 can be kept stopped surely at the rotational position in the state Q12.

Meanwhile, paying attention to the rotation of the rotor 30 from the state Q1 to the state Q12, the rotational torque is increased by the intensities of the magnetic fields at the magnetic gaps (clearances) $G_{11}$ and $G_{12}$ caused by reduction in magnetic resistance of the closed magnetic path K1 by the provision of the auxiliary yoke 40.

At the next step, as shown in FIG. 4C, with the state of the stator 10 left unchanged, the positive and negative states of the terminals V3 and V4 of the coil 22 of the stator 20 are inverted to be positive and negative, respectively, and a current −I2 is let to flow in the coil 22 to bring about a state Q2 where the magnetic poles 23 and 24 are so magnetized as to be the N pole and the S pole, respectively. This state is the same as the state Q2 in FIG. 3B and the description of the diagram is directly applied thereto.

Paying attention to the rotation of the rotor 30 by 1/40 from the state Q12 to the state Q2, the rotational torque is increased by the intensities of the magnetic fields at the magnetic gaps (clearances) $G_{11}$, $G_{12}$, $G_{21}$ and $G_{22}$ caused by reduction in magnetic resistances of the closed magnetic paths K1 and K2 by the provision of the auxiliary yokes 40 and 50.

Figure 4D:
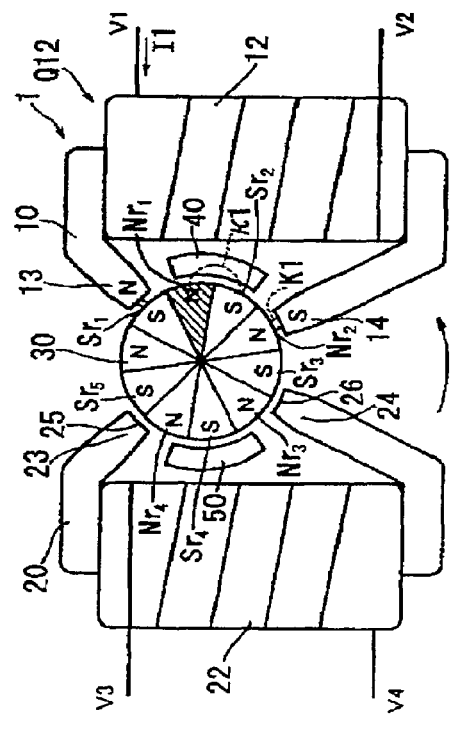

Next, as shown in FIG. 4D, energization to the coil 12 is stopped to cancel the excitation of the stator 10. In this state, the center portion of the magnetic pole $Sr_5$ of the rotor 30 which has large magnetization substantially directly faces the magnetic pole (N pole) 23 of the stator 20 in the radial direction, and the center portion of the magnetic pole $Nr_3$ of the rotor 30 which has large magnetization substantially directly faces the magnetic pole (S pole) 24 of the stator 20 in the radial direction. The rotor 30 takes a state Q23 where it is rotated from the state Q2 by 1/40 in the A1 direction. At this time, the magnetic poles 13 and 14 at both ends of the stator 10 which has been deexcited directly face the boundary portions of the N poles and the S poles of the rotor 30, respectively.

In this state Q23, about 2/3 of the magnetic pole $Nr_4$ and about 2/3 of the magnetic pole $Sr_4$ of the rotor 30 face the auxiliary yoke 50, and the magnetic path κ2 which leaves the magnetic pole $Nr_4$ of the rotor 30, passes the auxiliary yoke 50 and returns to the magnetic pole $Sr_2$ is formed. Regarding the stator 20, therefore, a substantial portion of the closed magnetic path K2 which enters the facing magnetic pole $Sr_5$ of the rotor magnet from the magnetic pole (N pole) 23 through the gap $G_{21}$, passes through the magnetic pole $Nr_3$ of the rotor magnet, then returns to the magnetic pole (S pole) 24 of the stator magnet 20 through the gap $G_{22}$ is given by the auxiliary yoke 50 made of a soft magnetic material and having a high permeability. As compared with a case where there is no auxiliary yoke 50, therefore, the magnetic resistance of the closed magnetic path K2 is reduced considerably. As a result, the intensities of the magnetic fields at the front gaps $G_{21}$ and $G_{22}$ of the magnetic poles 23 and 24 of the stator 20 according to the stator current −I2 are enhanced, so that the magnetostatic attraction with respect to the magnetic poles $Sr_5$ and $Nr_3$ of the rotor 30 can be increased.

Meanwhile, in the state Q23, about 1/4 of the magnetic pole $Nr_1$, about 1/4 of the magnetic pole $Nr_2$ and the magnetic pole $Sr_2$ of the rotor 30 face the auxiliary yoke 40.

The aforementioned increase in magnetostatic attraction between the stator 20 and the rotor 30 can enhance the magnetostatic stability of the rotor 30 of the stepping motor 1 in the state Q23. In other words, it also means that the rotor 30 can be kept stopped surely at the rotational position in the state Q23.

Paying attention to the rotation of the rotor 30 from the state Q2 to the state Q23, the rotational torque is increased by the intensities of the magnetic fields at the magnetic gaps (clearances) $G_{21}$ and $G_{22}$ caused by reduction in magnetic resistance of the closed magnetic path K2 by the provision of the auxiliary yoke 50.

Next, as shown in FIG. 5A, as the current −I1 is let to flow between the terminals V1 and V2 of the coil 12 in such a way that the magnetic poles 14 and 13 respectively become the N and S poles with respect to the stator 10 while the excitation state of the stator 20 is maintained, the state becomes the same state Q3 as shown in FIG. 3C. This state Q3 is what has been described about FIG. 3C, and the transition to the state Q3 from the state Q23 is substantially the same as what has been described about FIG. 4C.

Next, as shown in FIG. 5B, energization to the coil 22 is stopped to cancel the excitation of the stator 20 to go to a state Q34. This state Q34 is the same as the state Q12 shown in FIG. 4B except for the difference in the polarities of the stator 10 and the rotor 30. Therefore, the magnetostatic stability is enhanced so that the rotational torque from the state Q3 to the state Q34 can be increased in the same way as has been described for the state Q12.

Further next, as the current I2 is let to flow to the coil 22 of the stator 20 while keeping the excitation state of the stator 10, the state becomes the same state Q4 as shown in FIG. 3D. In this state Q4, the magnetostatic stability is enhanced so that the rotational torque from the state Q34 to the state Q4 can be increased in the same way as has been described for the states Q1, Q2 and Q3, as per the above-described case.

Next, as shown in FIG. 5D, energization to the coil 12 is stopped to cancel the excitation of the stator 10 to go to a state Q41. This state Q41 is the same as the state Q23 shown in FIG. 4D except for the difference in the polarities of the stator 20 and the rotor 30. Therefore, the magnetostatic stability is enhanced so that the rotational torque from the state Q4 to the state Q41 can be increased in the same way as has been described for the state Q23.

Further, as the current I1 is let to flow between the terminals V1 and V2 of the coil 12 while the excitation state of the stator 20 is maintained, the state returns to the state Q1 shown in FIG. 4A. The transition to the state Q1 from the state Q41 is substantially the same as the aforementioned transition to the state Q2 from the state Q12 and the aforementioned transition to the state Q3 from the state Q23, and the rotational torque from the state Q41 to the state Q1 can be increased.

The above description has been given of the example where the motor 1 has two auxiliary yokes 40 and 50. Depending on a case, however, one of the auxiliary yokes 40 and 50 may not be needed. The description of this example has been given of the example where the spread angles γ1 and γ2 of the auxiliary yokes 40 and 50 with regard to the rotational direction of the rotor 30 is ½ times the spread angle α of the magnetic poles Nr and Sr of the rotor 30. However, it may be smaller than ½ times as long as the angles γ1 and γ2>α. On the contrary, it may be greater than ½ times unless the magnetic poles are not magnetostatically coupled directly to the magnetic poles of the adjoining stator. Here, with regard to the auxiliary yokes 40 and 50, substantially apart from the magnetic poles 13, 14, 23 and 24 of the stators means substantially isolation in the excited states of the magnetic poles 13, 14, 23 and 24 of the stators.

Further, also the spread angles of the auxiliary yokes 40 and 50 are identical in this example, both may be different from each other.

In addition, while the partly cylindrical auxiliary yokes 40 and 50 are illustrated as having longer axial-directional lengths than the rotor 30 in the perspective view of FIG. 1, they may be shorter as long as leakage of the line of magnetic force in the axial direction can be sufficiently suppressed. For example, they may be about the same as the height (thickness) of the rotor 30 in the axial direction. That is, for example, the upper end of the auxiliary yoke 50 may be positioned nearly flush with a top surface 33 of the rotor 30 as indicated by an imaginary line 50i in FIG. 1 (the same is true of the lower end).

Second Embodiment

Figure 6A:
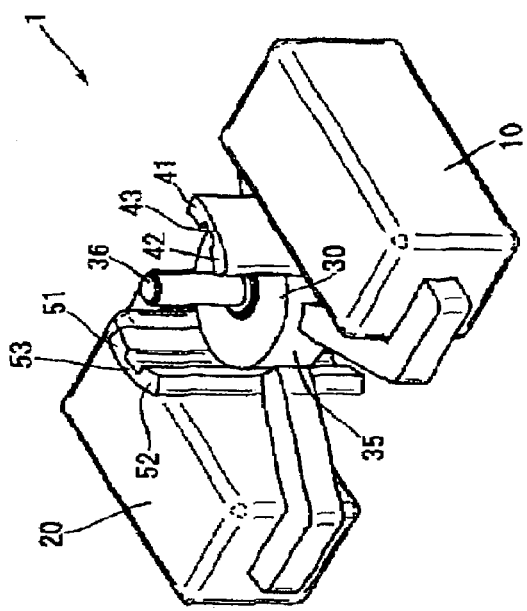
FIG. 6A is a plan explanatory view of one modification.
Figure 6B:
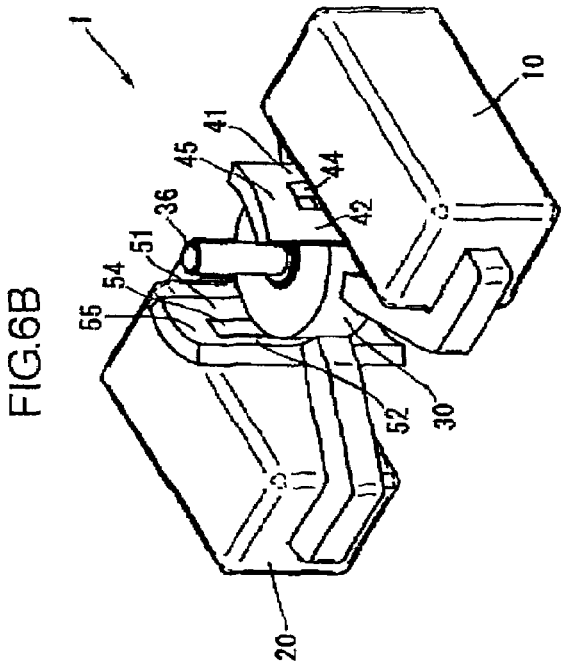
FIG. 6B is a perspective explanatory view of the stepping motor in FIG. 6A.
Figure 6C:
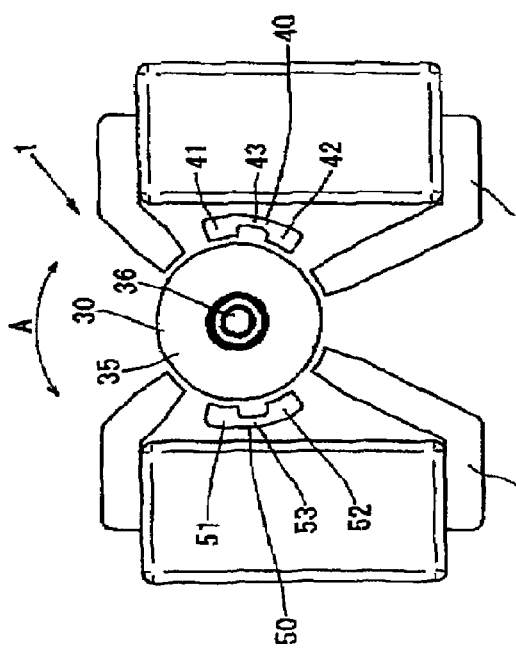
FIG. 6C is a plan explanatory view of another modification.
Figure 6D:
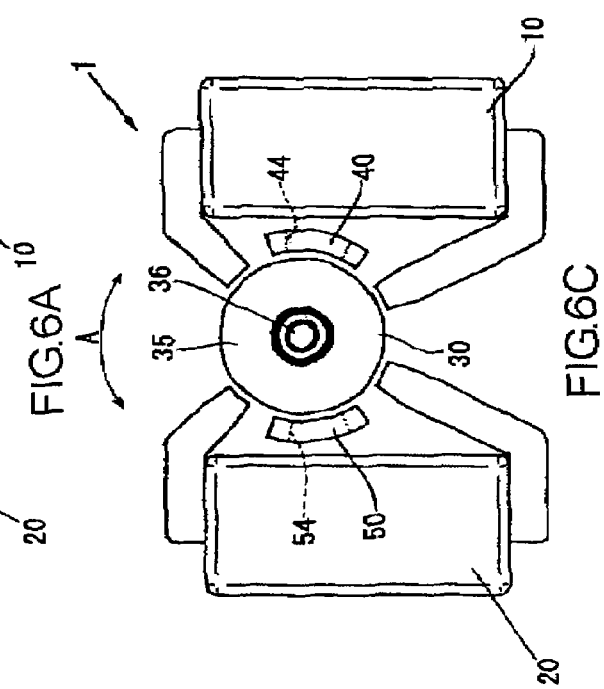
FIG. 6D is a perspective explanatory view of the stepping motor in FIG. 6C.

Further, instead of the auxiliary yoke 40 or 50 having a uniform thickness along the circumferential direction A as long as those portions which face both different magnetic pole portions Nr and Sr of the rotor 30 are substantially magnetostatically coupled, it may have a thin portion 43 or 53 having a groove or a cutaway in the middle between both end portions 41 and 42 or 51 and 52 in the circumferential direction A as shown in FIGS. 6A and 6B. An opening 44 or 54 may be formed in the middle portion in the circumferential direction A and both end portions 41 and 42 or 51 and 52 in the circumferential direction A may be linked at thick portions 45 or 55 on both axial-directional sides of the opening 44 or 54 as shown in FIGS. 6C and 6D. The formation of the groves, the cutaways, or the openings 44 and 45 in the auxiliary yokes 40 and 50 this way can make the stepping motor 1 lighter.

Third Embodiment

Although the foregoing description has been given of the example where the rotor 30 has ten poles, the number of poles of the rotor 30 may be greater or smaller.

Figure 7:
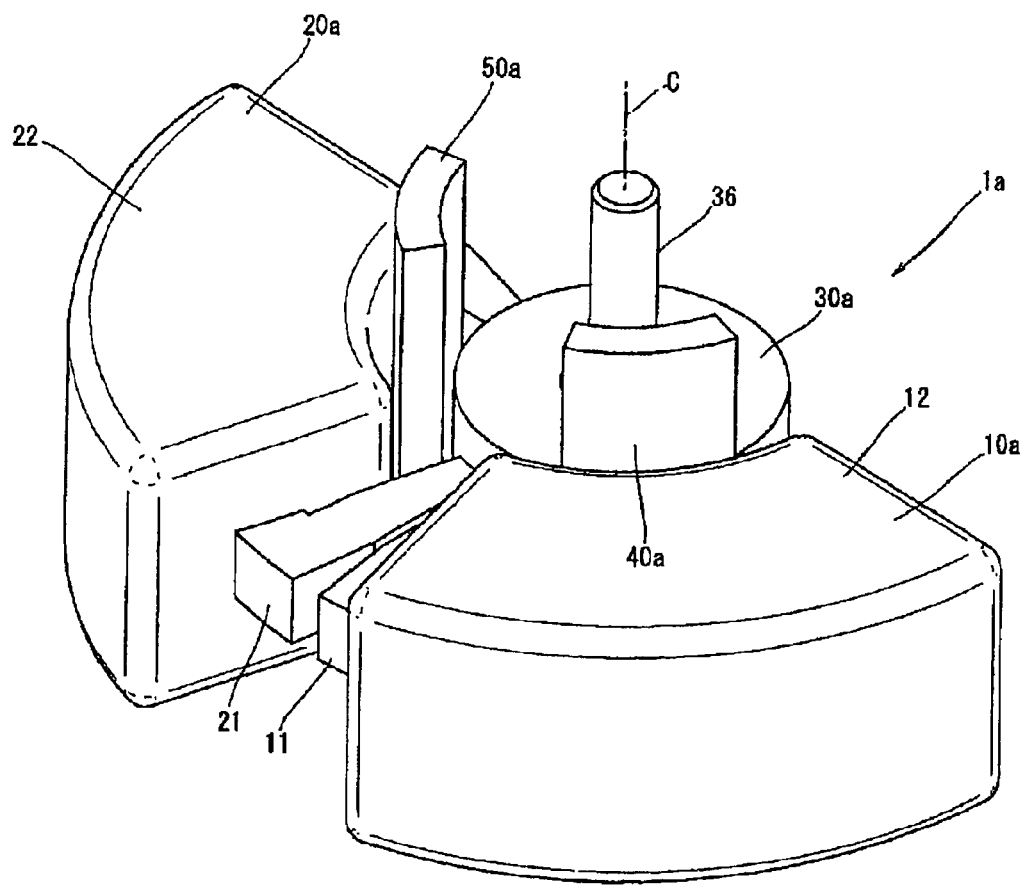
[FIG. 7] It is a perspective explanatory diagram of a stepping motor according to another preferable embodiment (third embodiment) of the invention.
Figure 8:
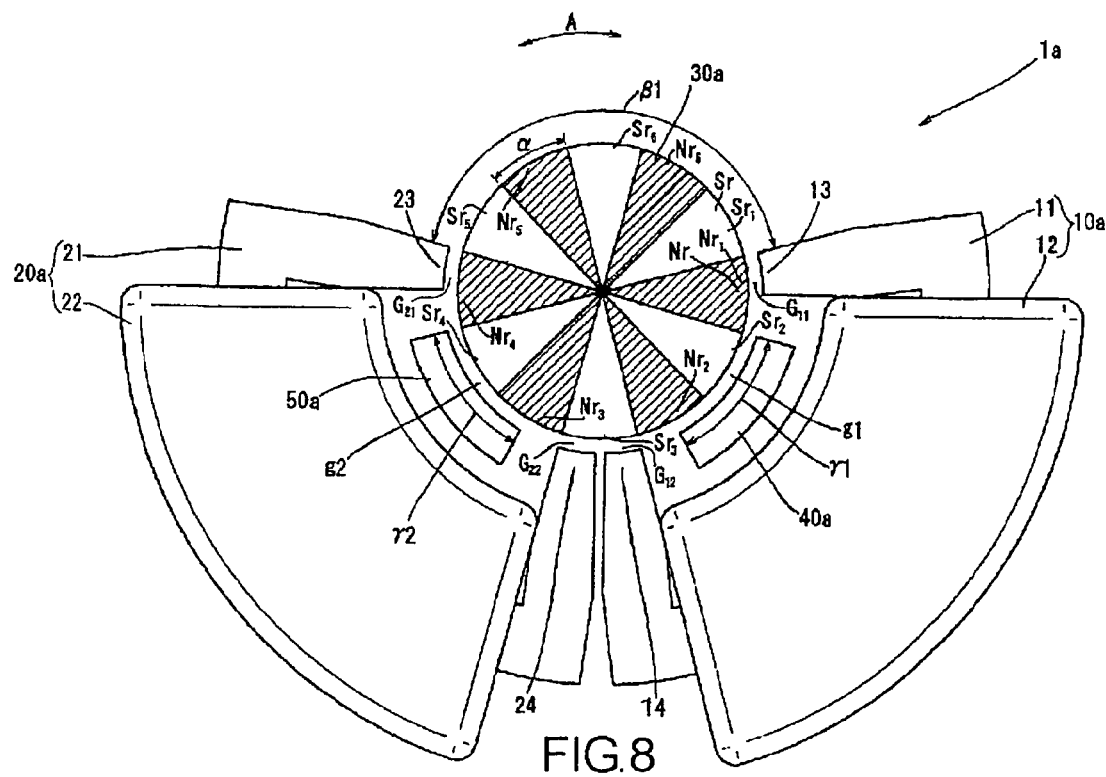
[FIG. 8] It is an exemplary plan explanatory view of the stepping motor in FIG. 7.

Next, a motor 1a whose rotor has twelve magnetic poles at equiangular distances will be described based on FIGS. 7 and 8. Same reference numerals are given to those members or elements of the motor 1a in FIGS. 7 and 8 which are similar to those of the motor 1 as shown in FIGS. 1 to 6, and those members or elements which are different have a subscript "a" attached to their reference numerals.

This rotor 30a is constructed in the same way as the rotor 30 except for the number of magnetic poles being twelve. That is, the rotor 30a has six N poles $Nr_1$ to $Nr_6$ (denoted by reference numeral Nr when they are not distinguished from one another or are generically referred to), and six S poles $Sr_1$ to $Sr_6$ (denoted by reference numeral Sr when they are not distinguished from one another or are generically referred to), with the spread angle α between the individual magnetic poles being 30 degrees (360 degrees/12).

Stators 10a and 20a of the motor 1a are constructed in the same way as the stators 10 and 20 except that arrangement is made in such a way that the angle defined between the magnetic poles 14 and 24 is β2=0 and the angle defined between the magnetic poles 13 and 23 is β1=5α. That is, the magnetic pole interval $βs_1=βs_2=5/2α$ and $βs_{11}=βs_{12}=βS_{21}=βs_{22}=βs=α/2$ in the motor 1a are the same as those of the motor 1 (those reference numerals are not shown in FIGS. 7 and 8 for the sake of diagrammatic simplicity). In this example, however, α=30 degrees as mentioned above.

That auxiliary yokes 40a and 50a are apart from the magnetic poles of the stators 10a and 20a by α/2 and spread over the angular range of 3α/2 is the same as that in the case of the motor 1.

As the auxiliary yoke 40a spreads over a larger angular range even in the motor 1a, the auxiliary yoke 40a always faces the adjoining magnetic poles Nr and Sr of the rotor 30a at the same time. Accordingly, a magnetic path with a low magnetic resistance is given at the portion corresponding to the magnetic path between the magnetic poles 13 and 14 of the stator 10a, so that the intensity of the magnetic field in the gap $G_{11}$, $G_{12}$ between the magnetic pole Nr or Sr which faces the magnetic pole 13 and the magnetic pole Sr or Nr which faces the magnetic pole 14 can be enhanced. The auxiliary yoke 50a operates the same way. That is, as the auxiliary yoke 50a spreads over a larger angular range, the auxiliary yoke 50a always faces the adjoining magnetic poles Nr and Sr of the rotor 30a at the same time, so that a magnetic path with a low magnetic resistance is given at the portion corresponding to the magnetic path between the magnetic poles 23 and 24 of the stator 20a, so that the intensity of the magnetic field in the gap $G_{21}$, $G_{22}$ between the magnetic pole Nr or Sr which faces the magnetic pole 23 and the magnetic pole Sr or Nr which faces the magnetic pole 24 can be enhanced. Even in this case, the auxiliary yokes 40 and 50 work to enhance the magnetization of the rotor. In the motor 1a, therefore, the rotational torque with respect to the rotor 30a can be increased as compared with the case where there are no auxiliary yokes 40a and 50a as has been described for the motor 1 referring to FIG. 3 or FIGS. 4 and 5. The multipolarization of the rotor 30a this way can improve the rotational position accuracy.

Fourth Embodiment

The auxiliary yoke may be provided either between the magnetic poles of the stator 10a or between the magnetic poles of the stator 20a.

Figure 9:
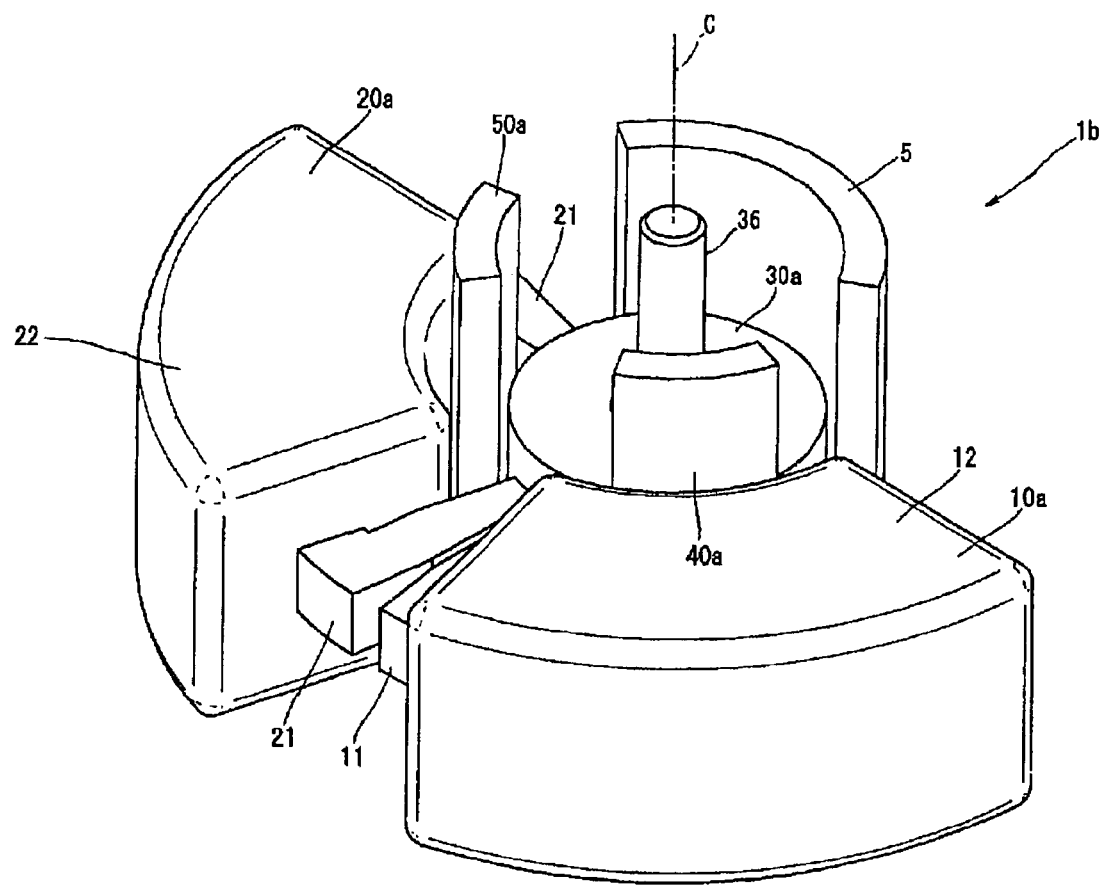
[FIG. 9] It is a perspective explanatory diagram of a stepping motor according to a further preferable embodiment (fourth embodiment) of the invention.
Figure 10:
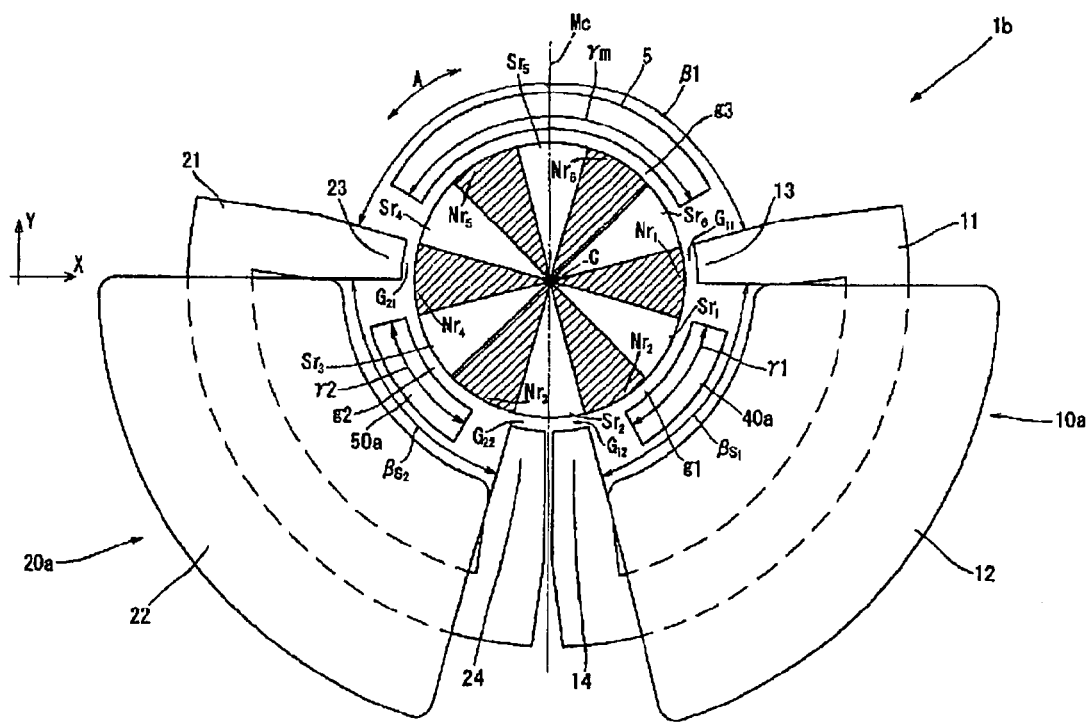
[FIG. 10] It is an exemplary plan explanatory view of the stepping motor in FIG. 9.

FIGS. 9 and 10 show, as a motor 1b, an example where the auxiliary yokes are provided between the stator magnetic poles and a partly cylindrical auxiliary yoke 5 of a soft magnetic material is provided between the stator 10a and the stator 20a.

For the sake of description, in FIG. 10, a fixed X-Y orthogonal coordinate system is taken for the stators 10a and 20a of the motor 1b, and the upper direction along a mirror symmetrical center line Mc in the plane in the diagram is taken as the positive direction of the Y axis while the rightward direction is taken as the positive direction of the X axis.

The auxiliary yoke 5 is provided between the stator 10a and the stator 20a and spreads in an angular range of γm=4α. The auxiliary yoke 5 faces the circumferential surface 31 of the rotor 30a via a narrow gap g3, and is positioned at its both ends with a gap of α/2 with respect to the adjoining magnetic poles 13 and 23. The auxiliary yoke 5 typically spreads on both sides with the mirror symmetrical center line Mc as the center, and it is normally preferable that the spread angle (length) γm in the circumferential direction A should be larger as long as the magnetostatic coupling between the adjoining magnetic poles 13 and 23 does not occur in the normal operation.

In the motor 1, as the stators 10a and 20a and the auxiliary yokes 40a and 50a are actually positioned more in the −Y direction than the rotor 30a, the −Y-directional force is applied to the rotor 30a, thereby suppressing the rotation of the rotor 30a. In the motor 1b, by way of contrast, the auxiliary yoke 5 is positioned facing the circumferential surface 31 of the rotor 30a in a substantial area located more in the +Y direction than the center axial line C of the rotor 30a. the auxiliary yoke 5 magnetized by the magnetic poles of the rotor 30a applies +Y-directional force to the rotor 30a, and this +Y-directional force to the rotor 30a, and this +Y-directional eccentric force is balanced with the −Y-directional eccentric force to be applied to the rotor 30a by the auxiliary yokes 40a and 50a, so that the rotor 30a is stably positioned on the rotational center axial line C and the rotor 30a rotates smoothly. As a result, the torque increased by the auxiliary yokes 40a and 50a laid out between the magnetic poles of the stators 10a and 20a help effectively and smoothly rotate the rotor 30a.

Fifth Embodiment

In the motor of the present invention, the number of stators may be greater than two in which case the number of the auxiliary yokes may be one, two or greater, and an auxiliary yoke is provided between the magnetic poles of each stator. As long as each auxiliary yoke is greater than the magnetic pole spread angle α (or its corresponding circumferential length) of the rotor, the interval between the magnetic poles of the stator (the angular distance between the magnetic poles of the stator or the number of rotor magnetic poles included in the magnetic poles of the stator) may be increased and a plurality of magnetostatically independent auxiliary yokes may be provided between the magnetic poles of the stator. In addition to the auxiliary yokes, soft magnetic material members whose spread angle is equal to or lower than the magnetic pole magnetic pole spread angle α of the rotor and which do not work as auxiliary yokes so-called in the present invention may be arranged at a part of the circumferential direction A facing the circumferential surface of the rotor.

Figure 11:
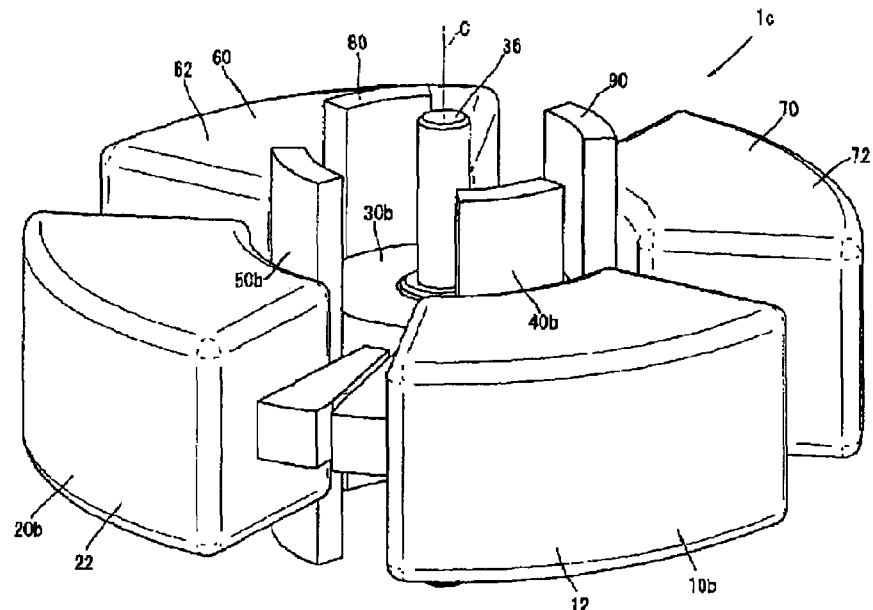
[FIG. 11] It is a perspective explanatory diagram of a stepping motor according to a yet further preferable embodiment (fifth embodiment) of the invention.
Figure 12:
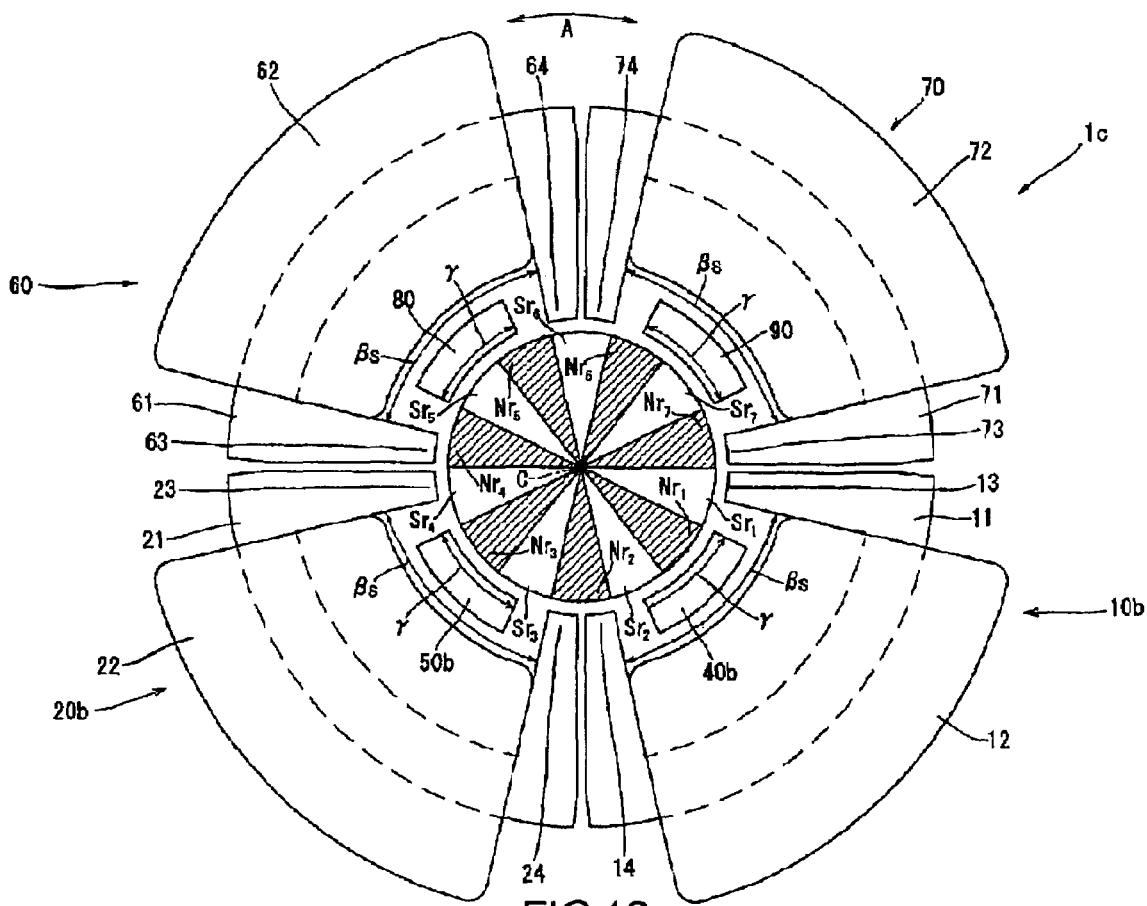
[FIG. 12] It is an exemplary plan explanatory view of the stepping motor in FIG. 11.

FIGS. 11 and 12 show a motor 1c which has a rotor 30b having fourteen magnetic poles, four stators 10b, 20b, 60 and 70, and four auxiliary yokes 40b, 50b, 80 and 90.

The stators 10b and 20b are arranged in an angular range of 5α/2 with respect to the rotor 30b with the fourteen poles. They are constructed in the same way as the stators 10a and 20a of the motor 1a or the motor 1b, except for that point. The entire stator 10b and 20b spread over an angular range of nearly 180 degrees. The auxiliary yokes 40b and 50b are arranged in an angular range of 5α/2 with respect to the rotor 30b with the fourteen poles.

The stator 60 is constructed in the same way as the stator 10b or 20b except for the difference in the position in the circumferential direction where it is provided, and has a yoke 61 of a soft magnetic material having a U shape (or a C shape) or a similar shape, and an excitation coil 62. The stator 70 is constructed in the same way as the stator 60. Consequently, the stators 10b, 20b, 60 and 70 are rotation symmetrical at positions around the center axial line C shifted from one another by 90 degrees.

The relative position of the auxiliary yoke 80 to the stator 60 is substantially the same as the relative position of the auxiliary yoke 40b to the stator 10b or the relative position of the auxiliary yoke 50b to the stator 20b, and the shape of the auxiliary yoke 80 is substantially the same as the shape of the auxiliary yoke 40b or the shape of the auxiliary yoke 50b. Likewise, the relative position of the auxiliary yoke 90 to the stator 70 is substantially the same as the relative position of the auxiliary yoke 40b to the stator 10b or the relative position of the auxiliary yoke 50b to the stator 20b, and the shape of the auxiliary yoke 90 is also substantially the same as the shape of the auxiliary yoke 40b or the shape of the auxiliary yoke 50b. Consequently, the auxiliary yokes 40b, 50b, 80 and 90 are rotation symmetrical at positions around the center axial line C shifted from one another by 90 degrees.

Even in the motor 1c constructed in the above-described manner, the auxiliary yokes 40b, 50b, 80 and 90 reduce the magnetic resistances of the magnetostatic paths between the magnetic poles of the corresponding stators 10b, 20b, 60 and 70, thereby increasing the rotational torque with respect to the rotor 30b.

The present invention is not limited to a stepping motor but can be adapted to an electromagnetic actuator having a stator and a multipole rotor without departing from the technical scope.

The present invention is based on Japanese Patent Application No. 2003-306240 filed on Aug. 29, 2003. The present specification includes the specification, claims, and drawings of the application by reference.

INDUSTRIAL APPLICABILITY

The electromagnetic actuator according to the present invention can be used in, for example, the drive unit of a portable device.

The invention claimed is:

1. An electromagnetic actuator, comprising:
a rotor (30, 30a, 30b) which has multiple magnetic poles (Nr, Sr) on a circumferential surface (31) thereof, and
a plurality of stators (10, 10a, 10b, 20, 20a, 20b, 60, 70) in an electromagnet form which have at least two magnetic poles (13, 14, 23, 24, 63, 64, 73, 74) facing said circumferential surface (31) of said rotor (30, 30a, 30b),
wherein each stator in said plurality of stators (10, 10a, 10b, 20, 20a, 20b, 60, 70) individually includes a respectively associated yoke (11, 21, 61, 71) and coil (12, 22, 62, 72), wherein each coil is configured to magnetize its respectively associated yoke,
an auxiliaiy yoke (40, 40a, 40b, 50, 50a, 50b, 80, 90) extending in a circumferential direction (A) of the magnetic poles (Nr, Sr) of said rotor (30, 30a, 30b) over an angular range which is larger than a spread angle (α) of said magnetic poles (Nr, Sr) of said rotor (30, 30a, 30b) in said circumferential direction (A) is provided between said magnetic poles (13, 14, 23, 24, 63, 64, 73, 74) of at least one of said stators (10, 10a, 10b, 20, 20a, 20b, 60, 70), wherein
said auxiliary yoke (40, 40a, 40b, 50, 50a, 50b, 80, 90) is not directly magnetized by said coil (12, 22, 62, 72).

2. The electromagnetic actuator according to claim 1, wherein said auxiliary yoke (40, 40a, 40b, 50, 50a, 50b, 80, 90) extending in said circumferential direction (A) over an angular range which is larger than the spread angle (α) of the magnetic poles (Nr, Sr) of said rotor (30, 30a, 30b) in the circumferential direction (A) is provided between said magnetic poles (13, 14, 23, 24, 63, 64, 73, 74) of each of said stators (10, 10a, 10b, 20, 20a, 20b, 60, 70).

3. An electromagnetic actuator, comprising:
a rotor (30, 30a, 30b) which has multiple magnetic poles (Nr, Sr) on a circumferential surface (31) thereof, and
a plurality of stators (10, 10a, 10b, 20, 20a, 20b, 60, 70) in an electromagnet form which have at least two magnetic poles (13, 14,23, 24, 63, 64, 73, 74) facing said circumferential surface (31) of said rotor (30, 30a, 30b),
wherein each stator in said plurality of stators (10, 10a, 10b, 20, 20a, 20b, 60, 70) individually includes a respectively associated yoke (11, 21, 61, 71) and coil (12, 22, 62, 72), wherein each coil is configured to magnetize its respectively associated yoke,
an auxiliary yoke (40, 40a, 40b, 50, 50a, 50b, 80, 90) extending in a circumferential direction (A) of the magnetic poles (Nr, Sr) of said rotor (30, 30a, 30b) over an angular range which is larger than a spread angle (α) of said magnetic poles (Nr, Sr) of said rotor (30, 30a, 30b) in said circumferential direction (A) is provided between said magnetic poles (13, 14, 23, 24, 63, 64, 73, 74) of at least one of said stators (10, 10a, 10b, 20, 20a, 20b, 60, 70), wherein
said auxiliary yoke (40, 40a, 40b, 50, 50a, 50b, 80, 90) is not directly magnetized by said coil (12, 22, 62, 72),
wherein said auxiliary yoke (40, 40a, 40b, 50, 50a, 50b, 80, 90) extending in said circumferential direction (A) over an angular range which is larger than the spread angle (α) of the magnetic poles (Nr, Sr) of said rotor (30, 30a, 30b) in the circumferential direction (A) is provided between said magnetic poles (13, 14, 23, 24, 63, 64, 73, 74) of each of said stators (10, 10a, 10b, 20, 20a, 20b, 60, 70),
wherein an auxiliary yoke (5) extending in said circumferential direction (A) over an angular range which is larger than the spread angle (α) of the magnetic poles (Nr, Sr) of said rotor (30, 30a, 30b) in the circumferential direction (A) is provided between one stator (10a) in said plurality of stators (10, 10a, 10b, 20, 20b, 60, 70) and another stator (20a) adjoining that stator (10a),
wherein a groove, a cutaway or an opening (44, 54) is formed in an intermediate portion of the magnetic poles (Nr, Sr) of said rotor (30, 30a, 30b) of said auxiliary yoke (5, 40, 40a, 40b, 50, 50a, 50b, 80, 90) in the circumferential direction (A).

4. The electromagnetic actuator according to claim 1,
wherein a groove, a cutaway or an opening (44, 54) is formed in an intermediate portion of the magnetic poles (Nr, Sr) of said rotor (30, 30a, 30b) of said auxiliary yoke (5, 40, 40a, 40b, 50, 50a, 50b, 80, 90) in the circumferential direction (A).

5. The electromagnetic actuator according to claim 2,
wherein a groove, a cutaway or an opening (44, 54) is formed in an intermediate portion of the magnetic poles (Nr, Sr) of said rotor (30, 30a, 30b) of said auxiliary yoke (5, 40, 40a, 40b, 50, 50a, 50b, 80, 90) in the circumferential direction (A).

6. The electromagnetic actuator according to claim 1,
wherein an auxiliary yoke (5) extending in said circumferential direction (A) over an angular range which is larger than the spread angle (α) of the magnetic poles (Nr, Sr) of said rotor (30, 30a, 30b) in the circumferential direction (A) is provided between one stator (10a) in said plurality of stators (10, 10a, 10b, 20, 20a, 20b, 60, 70) and another stator (20a) adjoining that stator (10a).

7. The electromagnetic actuator according to claim 2,
wherein an auxiliary yoke (5) extending in said circumferential direction (A) over an angular range which is larger than the spread angle (α) of the magnetic poles (Nr, Sr) of said rotor (30, 30a, 30b) in the circumferential direction (A) is provided between one stator (10a) in said plurality of stators (10, 10a, 10b, 20, 20a, 20b, 60, 70) and another stator (20a) adjoining that stator (10a).

8. The electromagnetic actuator according to claim 6,
wherein a groove, a cutaway or an opening (44, 54) is formed in an intermediate portion of the magnetic poles (Nr, Sr) of said rotor (30, 30a, 30b) of said auxiliary yoke (55, 40, 40a, 40b, 50, 50a, 50b, 80, 90) in the circumferential direction (A).

* * * * *